Oct. 5, 1965 F. J. ZIOLKO 3,209,398
APPARATUS FOR SHIRRING A CONTINUOUS TUBE OF CASING
Filed Aug. 31, 1961 15 Sheets-Sheet 1
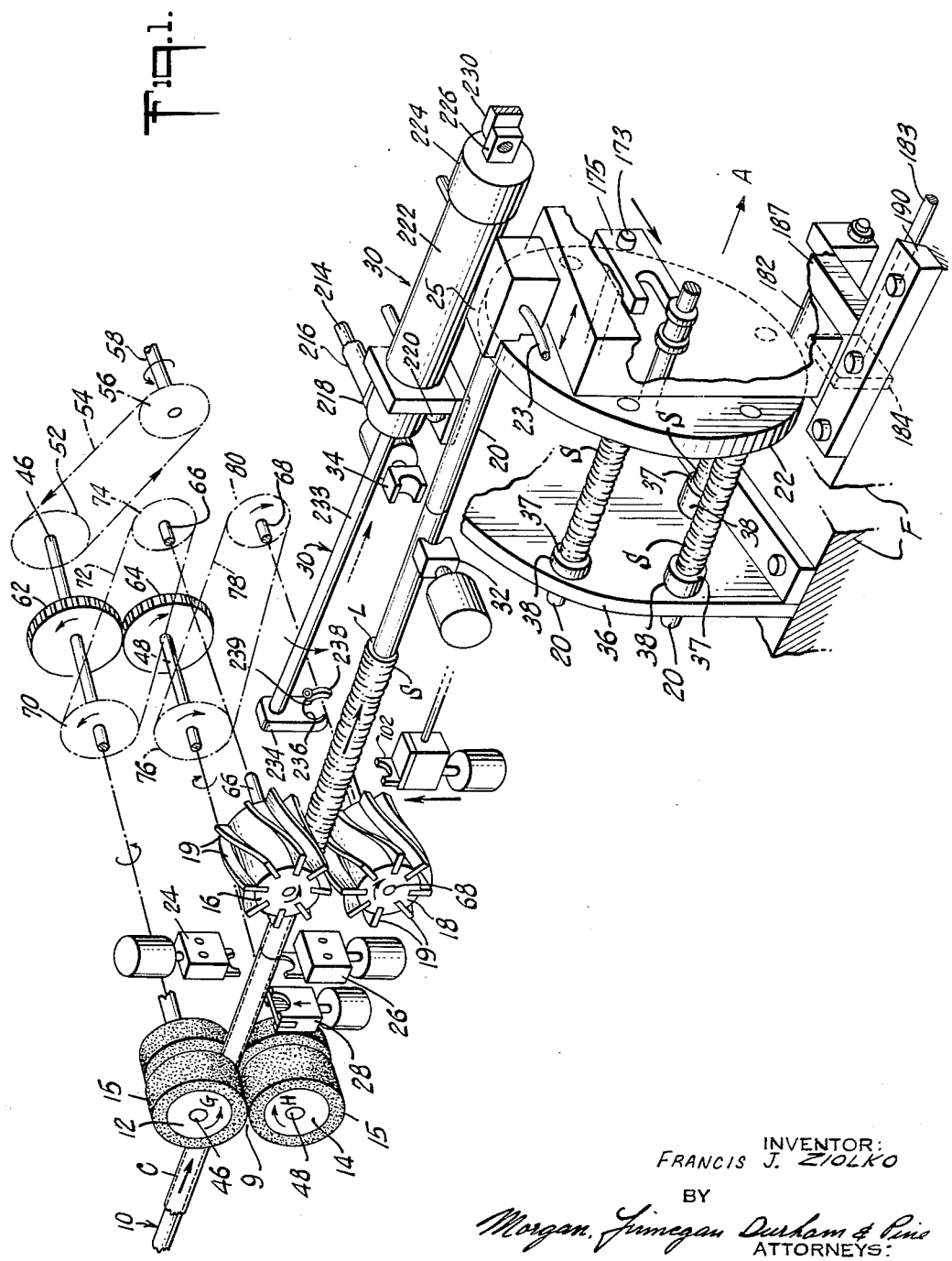
INVENTOR:
FRANCIS J. ZIOLKO
BY
Morgan, Finnegan, Durham & Pine
ATTORNEYS:

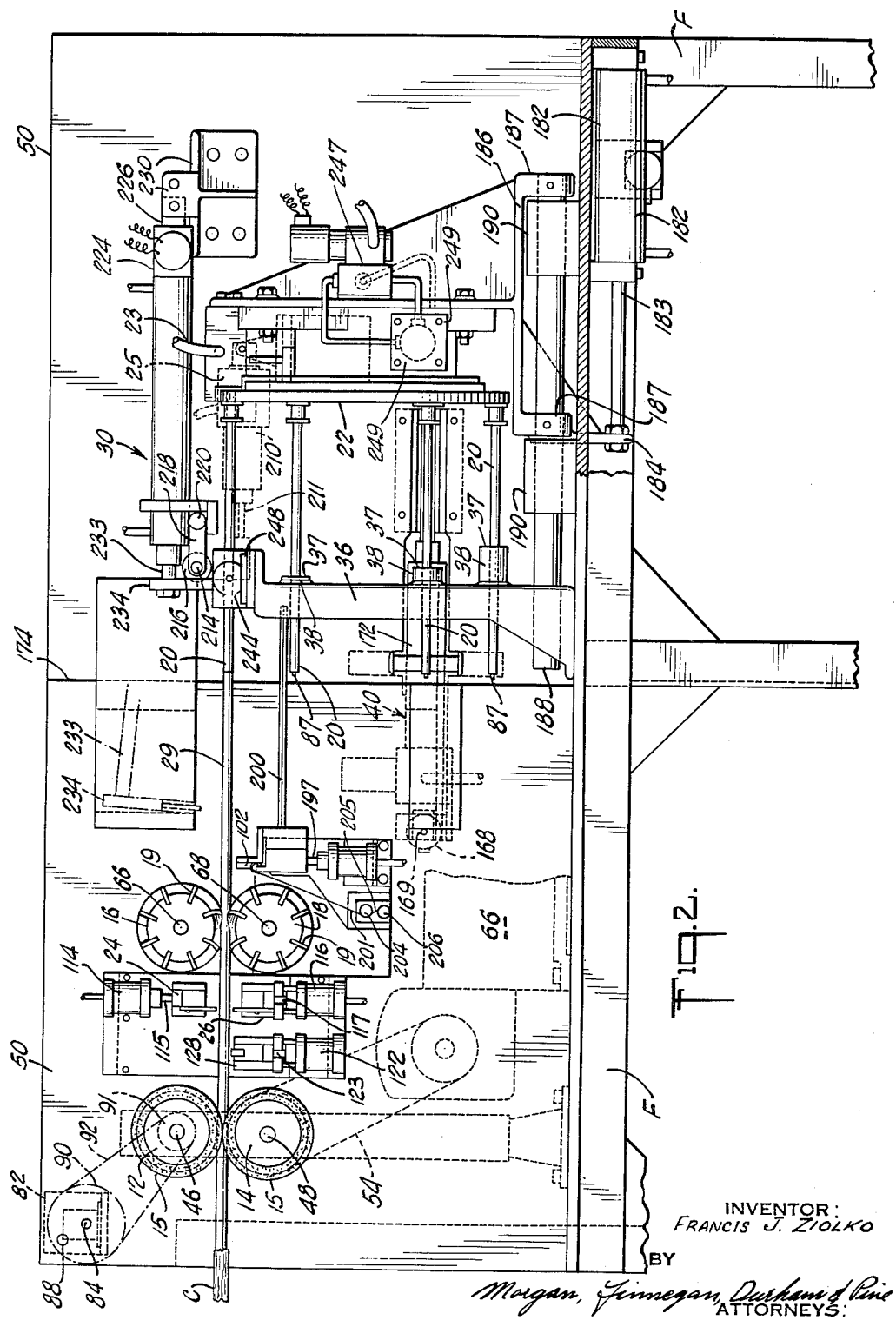

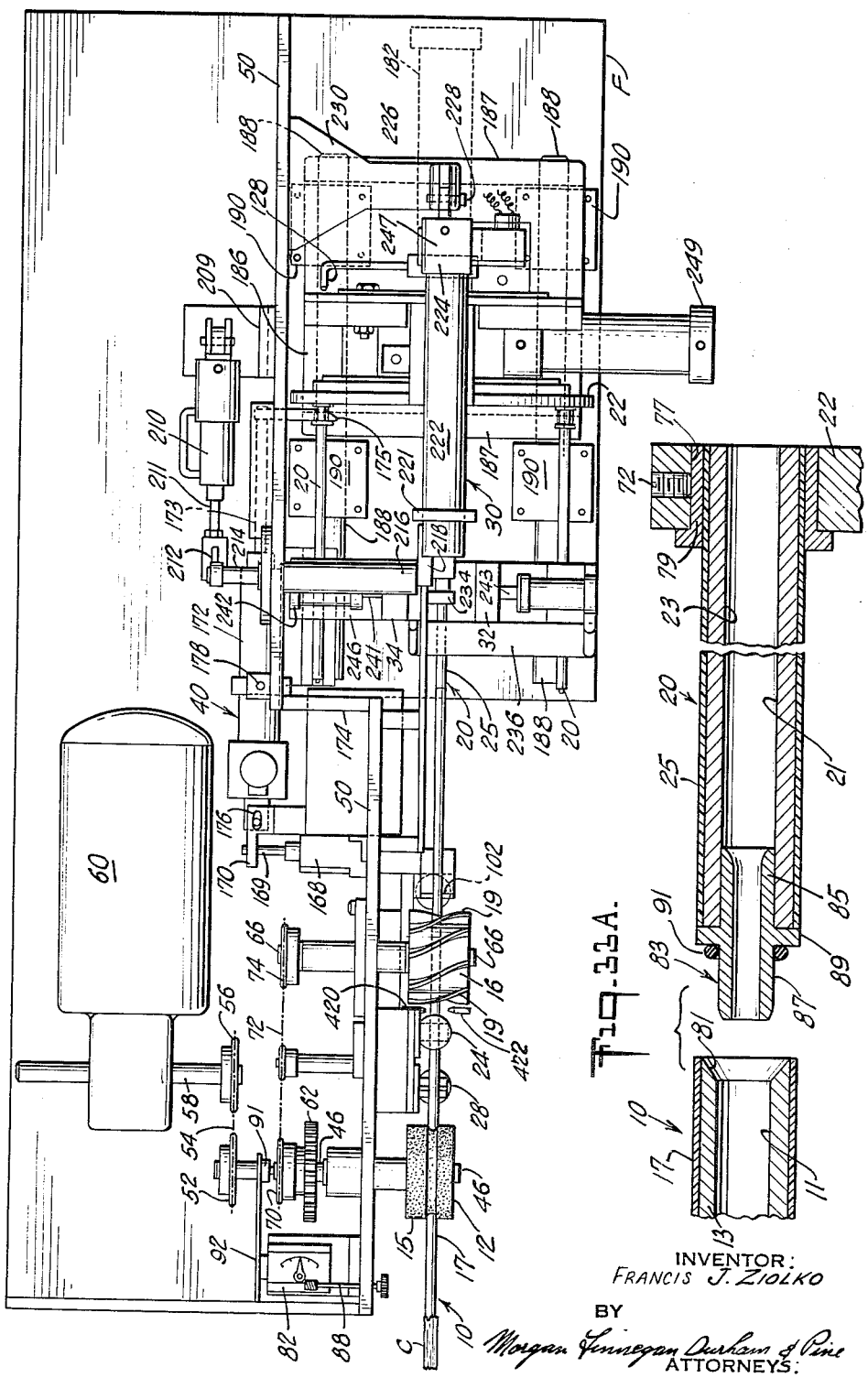

Oct. 5, 1965  F. J. ZIOLKO  3,209,398
APPARATUS FOR SHIRRING A CONTINUOUS TUBE OF CASING
Filed Aug. 31, 1961  15 Sheets-Sheet 4
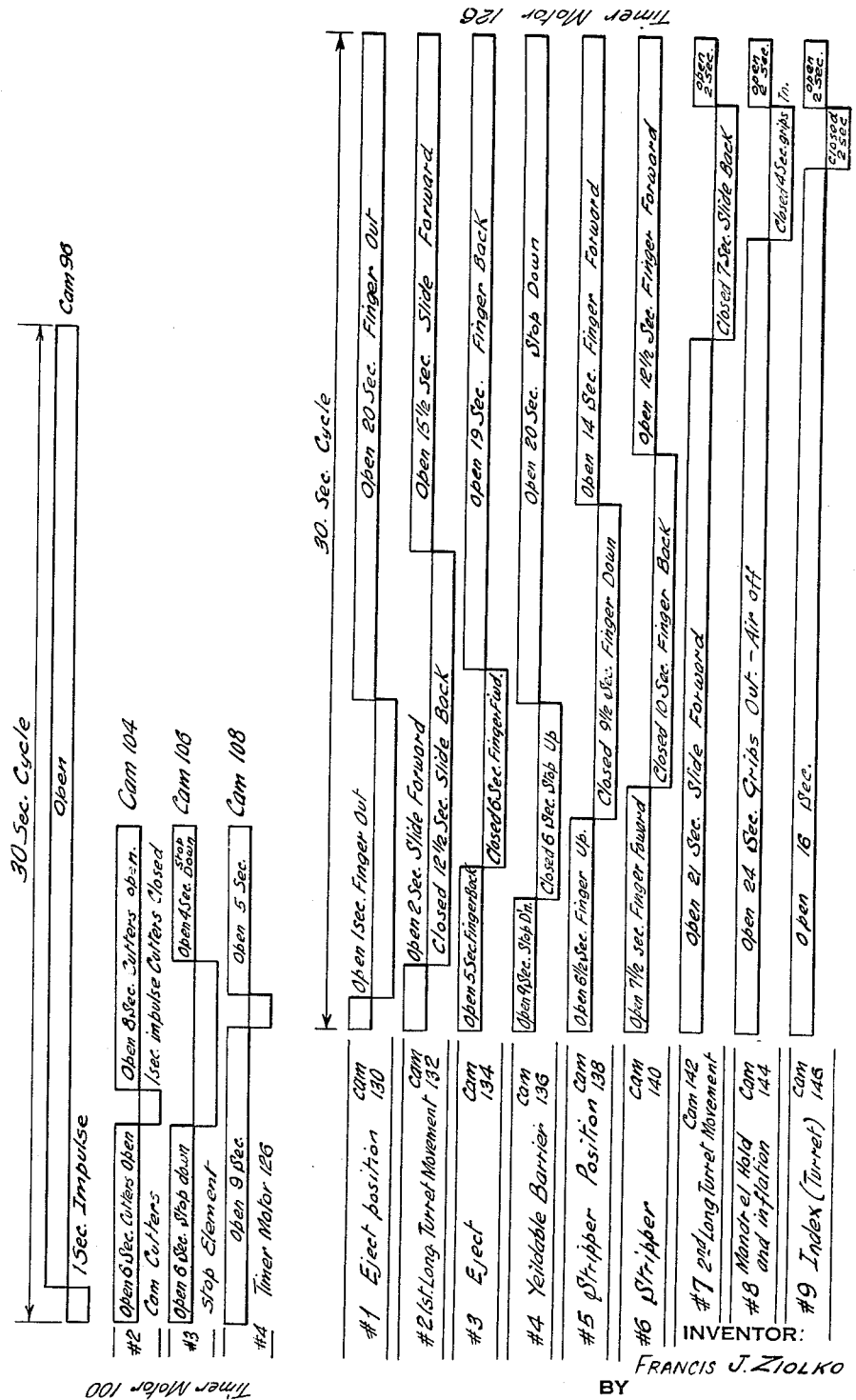
INVENTOR:
FRANCIS J. ZIOLKO
BY
Morgan, Finnegan, Durham & Pine
ATTORNEYS

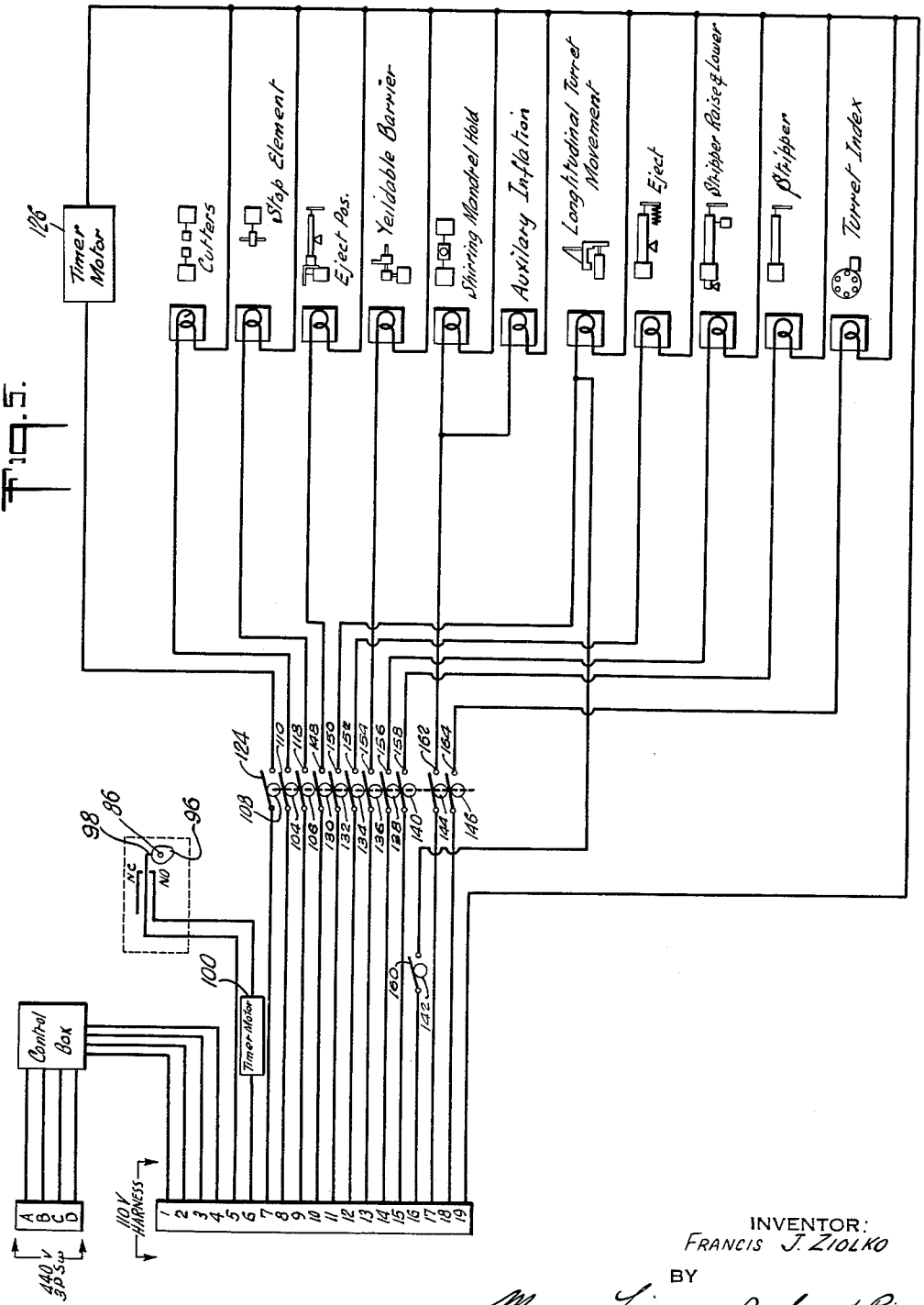

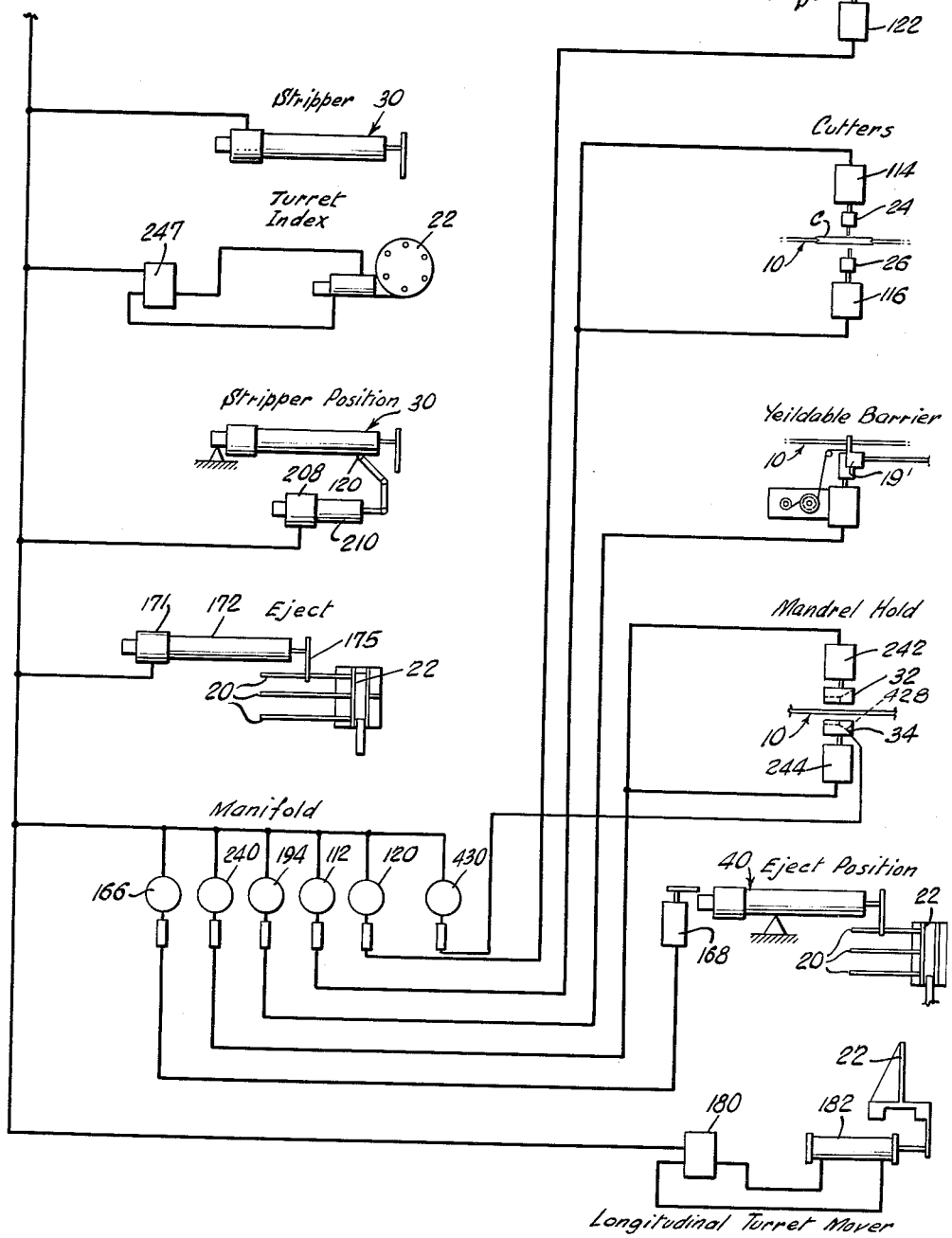

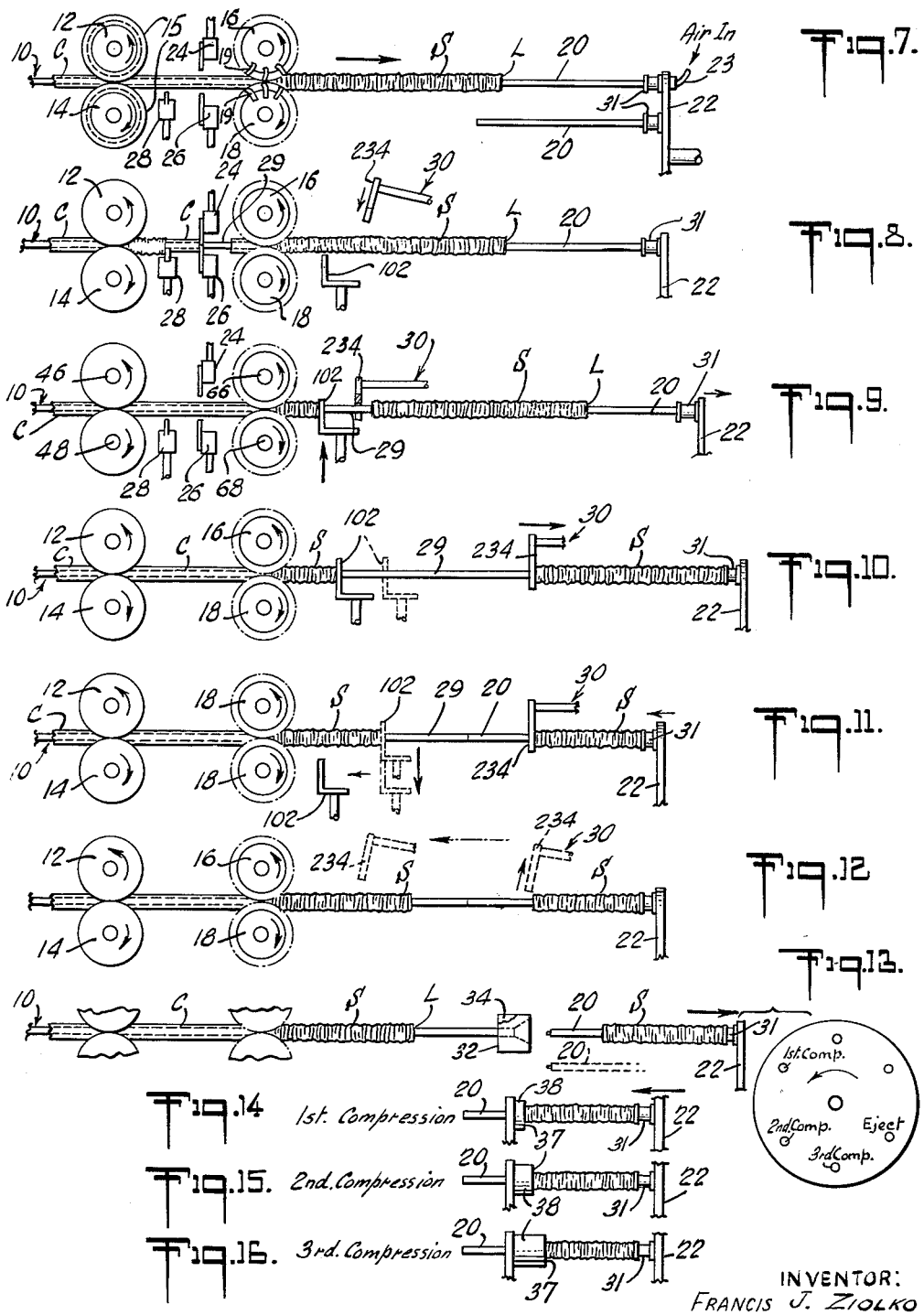

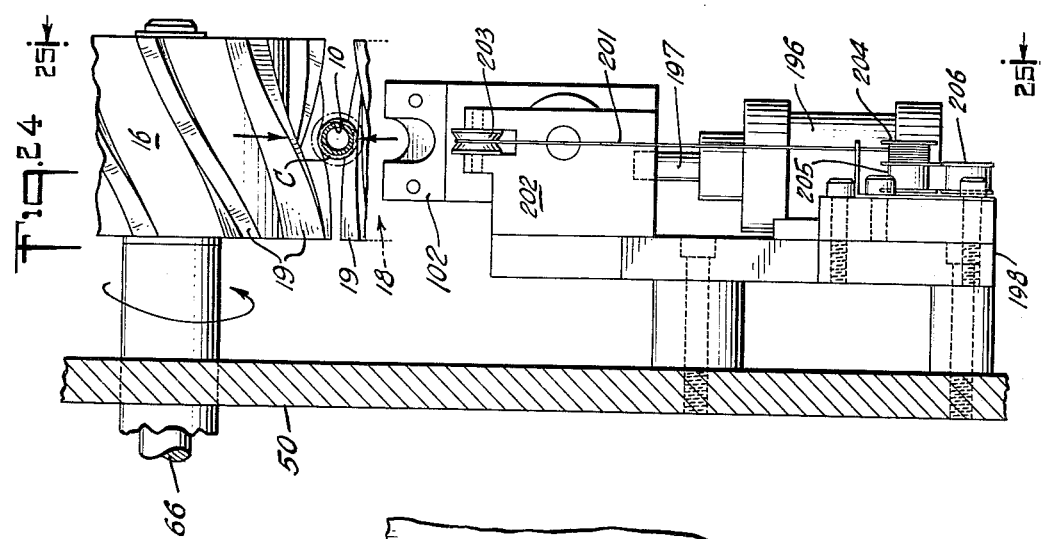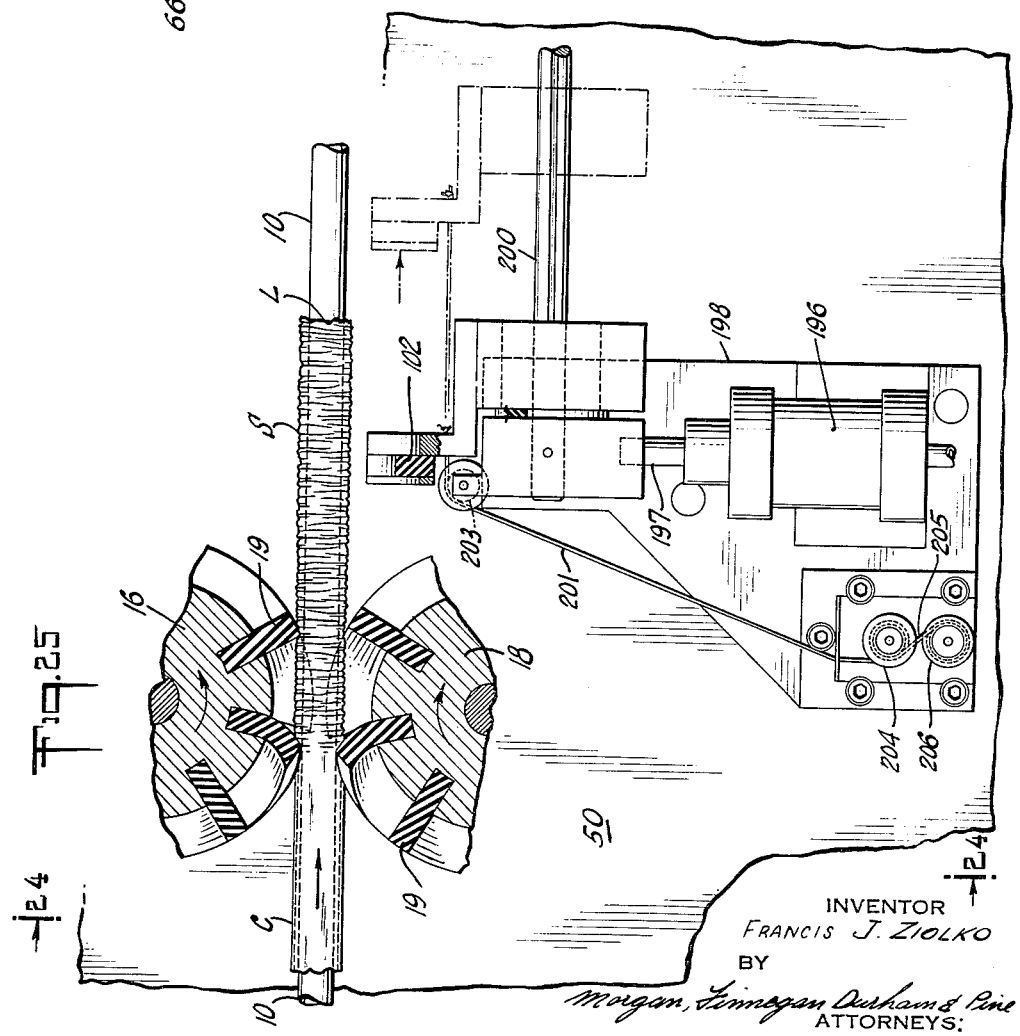

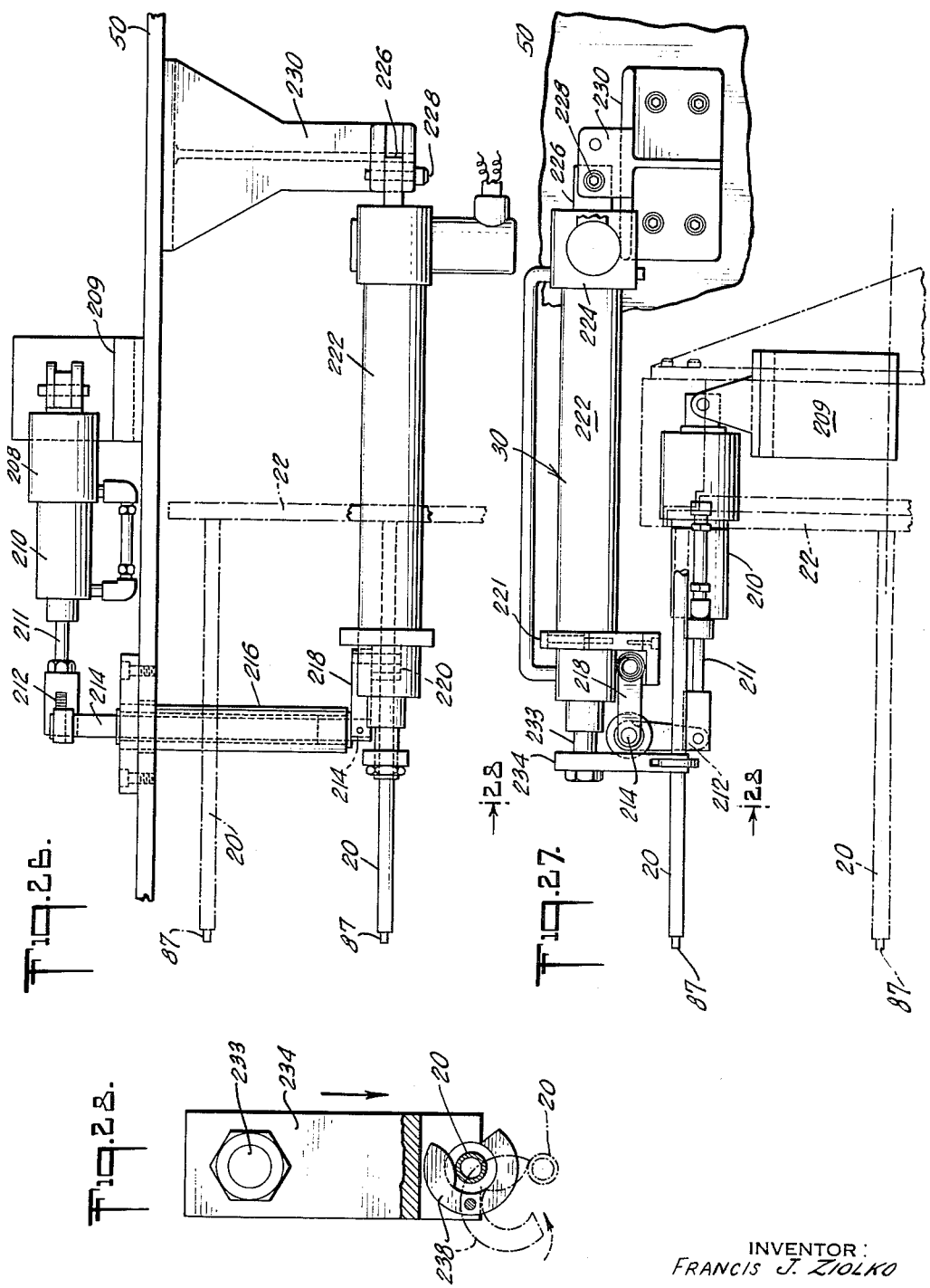

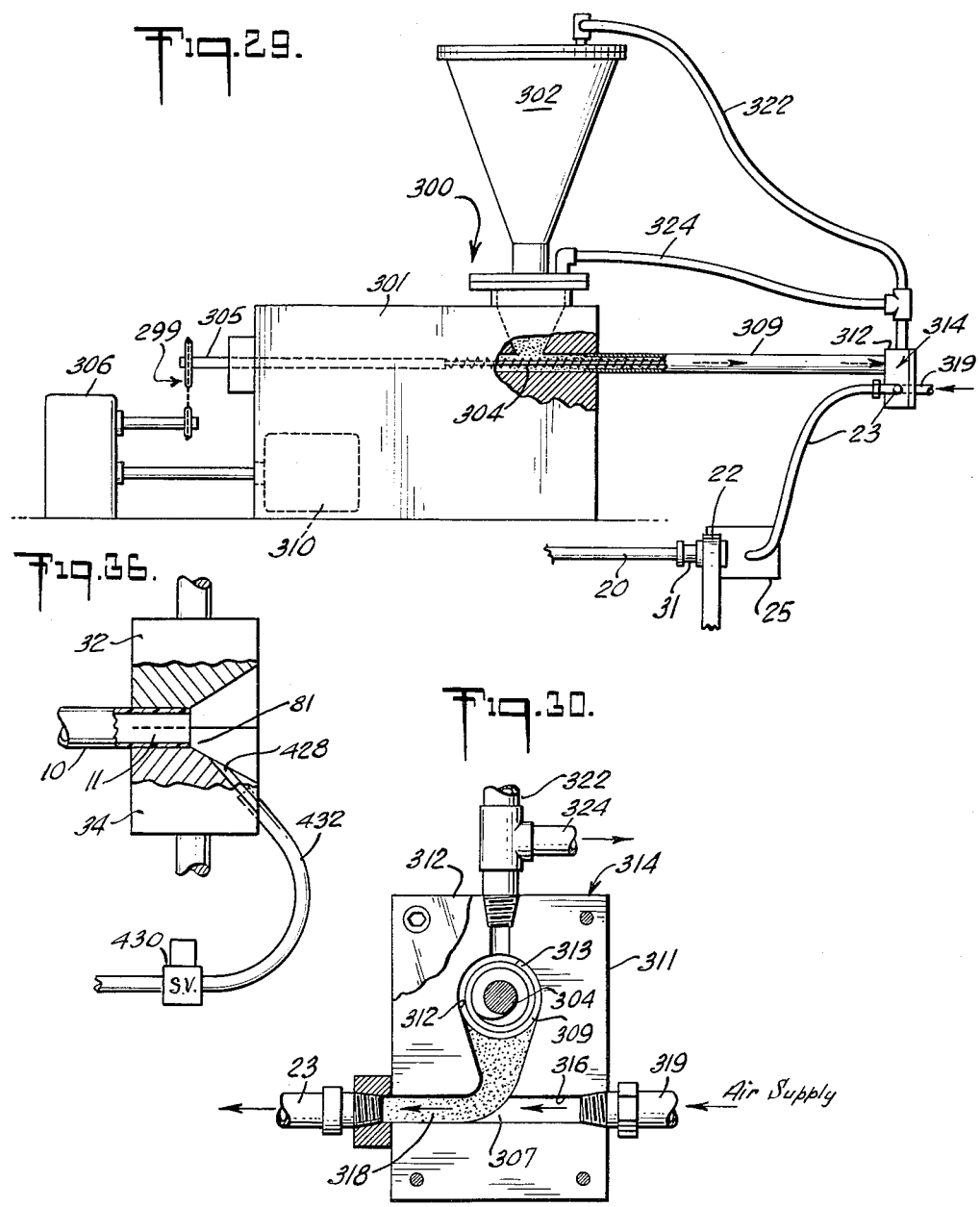

Oct. 5, 1965  F. J. ZIOLKO  3,209,398
APPARATUS FOR SHIRRING A CONTINUOUS TUBE OF CASING
Filed Aug. 31, 1961  15 Sheets-Sheet 13
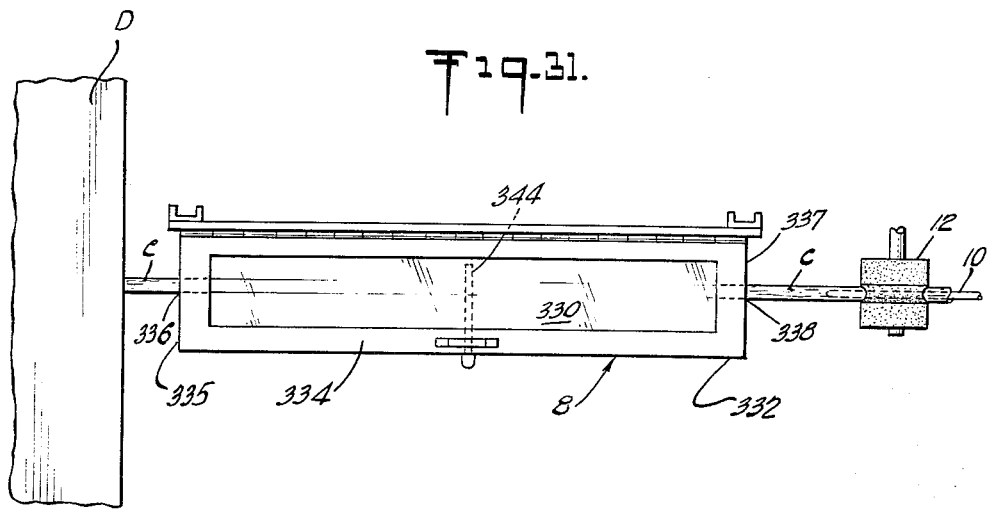
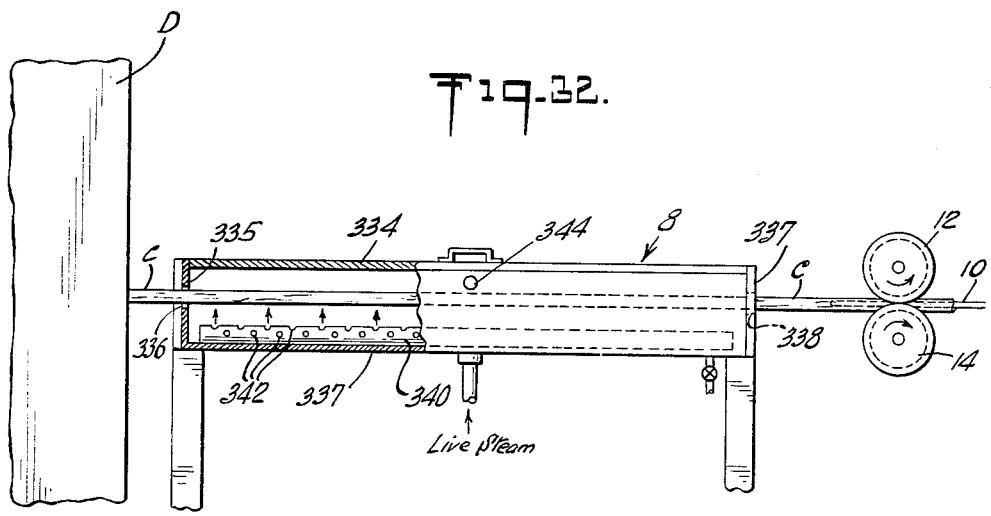
INVENTOR
FRANCIS J. ZIOLKO
BY
Morgan, Finnegan, Durham & Pine
ATTORNEYS

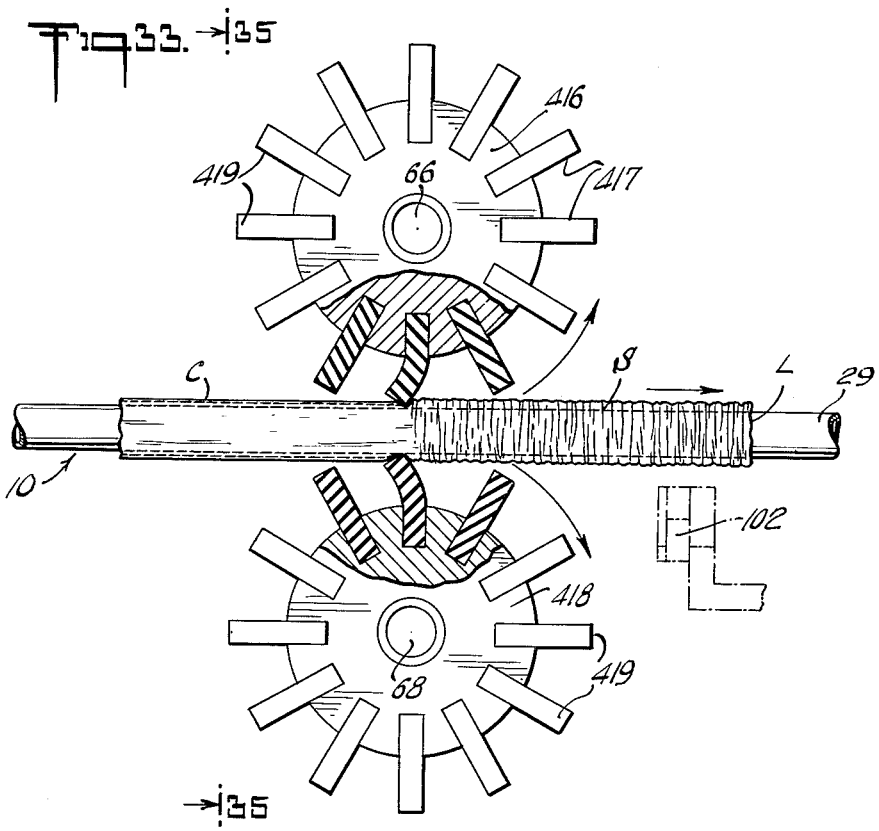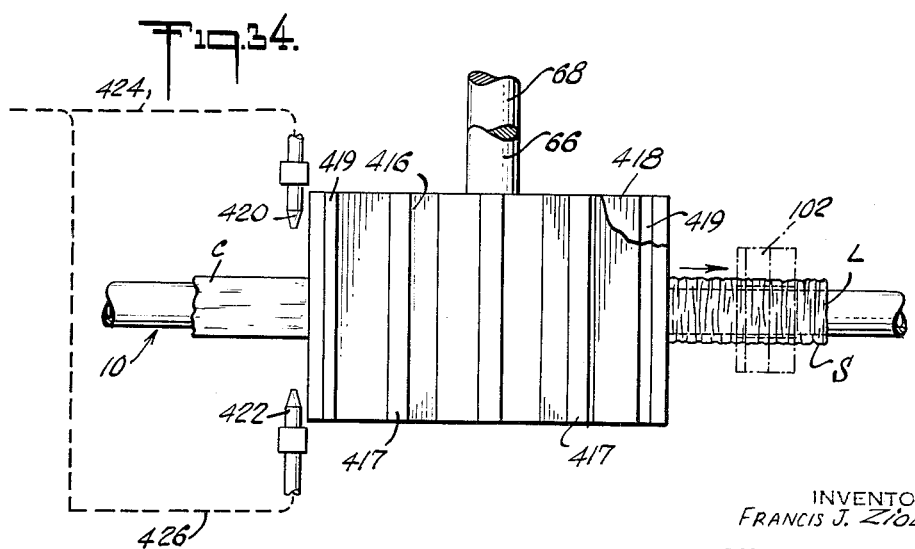

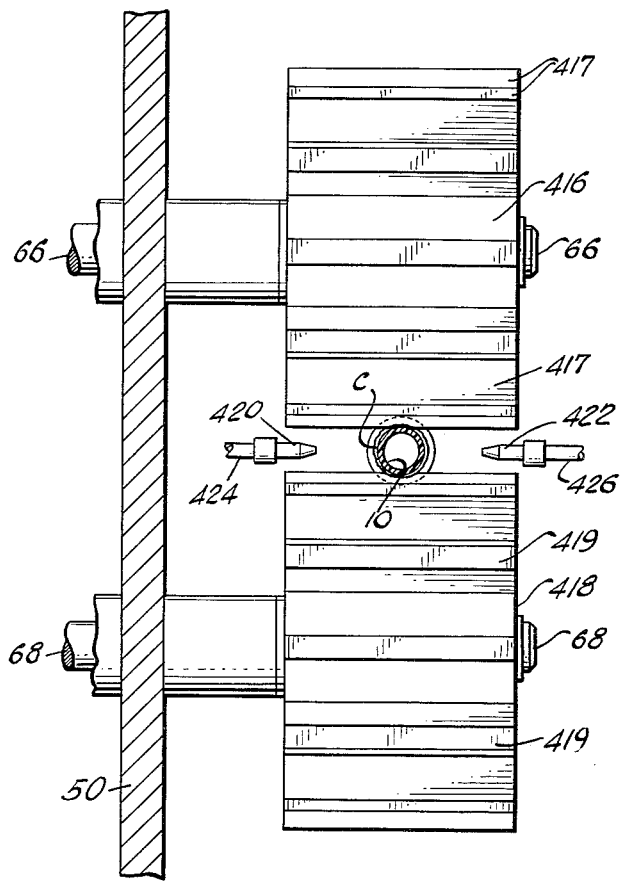

United States Patent Office 3,209,398
Patented Oct. 5, 1965

3,209,398
APPARATUS FOR SHIRRING A CONTINUOUS TUBE OF CASING
Francis Joseph Ziolko, Somerville, N.J., assignor to Johnson & Johnson, a corporation of New Jersey
Filed Aug. 31, 1961, Ser. No. 135,337
6 Claims. (Cl. 17—42)

This invention relates to the manufacture of casings from a continuous tube and, more particularly, to a new and improved apparatus for producing shirred and compressed casing lengths from a continuous tube of dried collagen.

The invention is particularly adapted for the production of a product to be utilized as an edible casing for fresh pork sausages which must be cooked by the consumer, as well as sausages of the wiener or frankfurter type. The latter sausages are generally processed by being smoked and cooked by the packer and are generally reheated before they are consumed. When such sausages are provided with edible casings, it is unnecessary to remove the casing before the sausage is eaten.

Natural casings derived from the intestines of sheep, hogs and cattle have a number of disadvantages. The natural casings vary in size and edibility. Except for some made from sheep intestines, they are tough and hard to masticate. Further, the natural casings are difficult to clean and prepare for human consumption. Likewise, they experience wide fluctuations in market price and availability. In addition, the thickness of the wall and the diameter of the natural casings will vary, presenting difficulties during modern high speed stuffing operations.

In view of these deficiencies, attempts have been made to produce better edible casings from protein sources such as collagen. It has been found that an exceedingly thin-walled collagen casing may be produced from a fluid mass of swollen collagen fibrils having a swollen collagen content much lower than heretofore used; namely, between 2.5 and 6 percent. The collagen mass is extruded in the form of a continuous tube, preferably through an extruder utilizing the action of counter-rotating discs. The extruded collagen tube is then subjected to post-extrusion processing, fully described in copending application Serial No. 82,934, filed January 14, 1961, now Patent No. 3,123,653, issued March 3, 1964, to form a continuous thin-walled tube of dried collagen which produces sausage casings that are very tender and easy to masticate after cooking.

Moreover, the casings so produced have been found to survive the stress and temperature involved in cooking so that there is substantially no shrinkage or rupturing of the casing or extrusion of the meat during the cooking process. The continuous tube of dried collagen, processed as described in the aforementioned Patent No. 3,123,653, is further processed to facilitate handling and stuffing thereof to produce the final sausage products.

The present invention provides a new and useful mechanism for pleating or shirring and severing the continuous collagen tube in predetermined lengths and compressing the shirred lengths into compact, shirred units for packaging and for ultimate application to a stuffing horn for filling with sausage emulsion to form a series of filled and linked sausages.

General description

As disclosed in the aforementioned Patent No. 3,123,653, the continuous, extruded and processed tubular body of collagen material is dried to thin tubular form by maintaining the length thereof inflated with a controlled air pressure as it passes through a drying chamber while, at the same time, warm air is blown over and around the exterior. During the normal continuous operation, air for inflating the tubular collagen body during the drying process is provided from a hollow shirring mandrel onto which the leading end of the dried inflated tubing is advanced by a pair of opposed feed rolls, the mandrel being axially disposed within the tubing.

In accordance with the present invention, the leading end of the continuous tube of dried collagen, advanced along the stationary shirring mandrel by the feed rolls, is engaged by a pair of continuously-actuated, shirring rolls having flexible projections or fingers which shirr or pleat the tubing against a yieldable barrier. These shirring fingers are formed of soft, resilient material, such as, sponge rubber, with a relatively long radius of bending for applying to the thin tubing a gentle, progressive and prolonged wiping action.

At the end of a predetermined length of time related to the length of tubing shirred, a cutter device is actuated from the feeding rolls to sever the shirred section. The shirred section is then transferred from the shirring mandrel to a coaxially extending transport mandrel aligned in operative association with the shirring mandrel. This transport mandrel is mounted on a rotatable turret which includes a plurality of transport mandrels which are successively presented into operative association with the shirring mandrel. The turret and the shirring mandrel are longitudinally reciprocated coaxially during the transfer step to jointly facilitate movement of the casing section from the shirring mandrel onto the transport mandrel.

With the shirred casing section transferred onto its associated transport mandrel, the rotatable turret head only is travelled longitudinally, moving the transport mandrel with the shirred section transferred thereto out of engagement with the shirring mandrel. The turret is then rotated to bring the next successive transport mandrel into alignment with the shirring mandrel and the turret is travelled longitudinally forward to position this next transport mandrel into operative relationship with the shirring mandrel. The previously shirred sections are carried step-wise by their associated transport mandrels to and through a plurality of compression stations to an ejection station where the shirred and compressed section is stripped from its mandrel. The compression stations are provided to form each shirred section into a compact unit for easier handling and packaging.

The successive compression stations are arranged and constructed to apply an increasing axial compressive force to the shirred section as it travels therepast towards the ejection station. The compression stations include a front wall which engages the leading end of the section on the transport mandrel when the turret is in its forward position. This front wall is provided with abutments at the successive compression stations against which the leading end of the shirred sections bear. The abutments at the successive compression stations extend for successively greater distances from the front wall and, since the distance between the forward position of the turret and the front wall is constant, the shirred sections on the associated transport mandrels are compressed into successively smaller lengths. It has been found that successive applications of a gradually increasing compression force in contrast to the full application of steady compression force produces a length of shirred tubing that has more pronounced cohesion or compactness and less tendency to return to its uncompressed length.

In addition, the invention provides for partially re-humidifying the dried collagen tube after drying and prior to shirring. During the shirring operation, folds or creases are formed in the casing wall as part of the shirring process. When overly dry, the collagen tube exhibits certain parchment-like qualities, especially when the wall thickness of the dried tube may be of the order of .001 inch or less. If the thin tubular body to be shirred is overly dry and thus brittle, the shirring stresses may crack the casing wall, making such casing unsuitable for stuffing. Therefore, it is desirable to control and partially re-humidify the collagen tube after drying and prior to shirring. This makes the tube soft and pliable and able to be shirred without adverse effects, in spite of its great thinness and delicate composition.

To partially re-humidify the dried collagen tube for such purpose, there is provided a re-humidifying chamber through which the inflated tube travels after drying and prior to shirring. The re-humidifying chamber is insulated and includes a conduit which emits steam or water vapor. The temperature and relative humidity of the chamber are controlled by the shirring operator to produce a dry but pliable collagen tube suitable for shirring without cracking. Further, it has been found that the re-humidified collagen tube has improved shirring characteristics and retains its compressed shape better.

It has also been found that presence of a proteinaceous material, such as albumin, may assist the casing in surviving the cooking stresses and temperature, as more particularly described and claimed in co-pending Patent No. 3,123,480. One suitable method of applying this proteinaceous material to the collagen tube is by blowing dry albumin powder into and through the inflated casing as it passes through the drying chamber. The present invention includes mechanism for injecting a selected amount of albumin powder into the air stream emitted by the shirring mandrel for inflating the casing during the drying and shirring processes. This mechanism includes a metering device for supplying a desired amount of albumin powder into a manifold chamber. The manifold chamber is connected on its entry side to a suitable air supply and on its exit side to the air supply valve for the shirring mandrel. As the desired amount of albumin powder is fed into the manifold chamber by the metering device, it becomes entrained in the air stream passing therethrough and is thus carried into and through the shirring mandrel for deposit on the inside of the inflated collagen tube.

Objects

It is, therefore, an object of this invention to provide a novel shirring mechanism for continuously and automatically producing shirred, compacted lengths of collagen casing from a continuous inflated tube of dried collagen.

An added object of the invention is to provide a novel shirring mechanism for continuously and automatically shirring a continuous collagen tube into compact shirred sections including a shirring mandrel and a longitudinally movable, rotatable indexing turret provided with a plurality of transport mandrels adapted to be successively connected to the shirring mandrel for engagement with a section of casing shirred onto the shirring mandrel whereby shirred sections are travelled stepwise on their associated transport mandrels from a transfer station through a plurality of compression stations to an ejector station.

Another object of the present invention is to provide a novel mechanism for preparing sausage casings which applies a conditioning coating to the inside of the collagen tubing wall and shirrs the coated tubing into desired compact lengths.

A further object of this invention is to provide a novel shirring mechanism employing a pair of co-acting opposed shirring rolls for continuously shirring dried collagen tubing onto a shirring mandrel, the rolls having flexible resilient shirring fingers formed thereon with a relatively long radius of bending for applying a gentle, progressive and prolonged wiping action to the outside of the tubing travelling between the opposed shirring rolls.

It is a further object of the invention to provide a novel shirring mechanism for continuously and automatically shirring, severing and compressing lengths of dried collagen tubing wherein the shirred and severed length of dried collagen tubing is subjected to a plurality of increasing axial compressive forces to produce a more cohesive shirred casing product.

Another object of the present invention is to provide mechanism for rehumidifying a dried collagen tubular body prior to shirring thereof to provide it with improved shirring characteristics.

The foregoing general description and the following detailed description are exemplary and explanatory but are not restrictive of the invention.

Of the drawings illustrating, by way of example, a preferred embodiment of the invention:

FIGURE 1 is a perspective view, partly schematic, of a device embodying the present invention;

FIGURE 2 is a side elevation of the embodiment of the invention shown in FIGURE 1;

FIGURE 3 is a plan view of the mechanism shown in FIGURE 2;

FIGURE 4 is a timing diagram of the cyclic operation of the invention;

FIGURE 5 is a schematic wiring diagram of a suitable electrical control system for the invention;

FIGURE 6 is a schematic diagram of a suitable pneumatic control system for the invention;

FIGURES 7–21 illustrate schematically the successive operations performed by the invention;

FIGURE 24 is a detailed view of the shirring mechanism of the invention;

FIGURE 25 is a sectional view, taken along line 25—25, FIGURE 24;

FIGURE 26 is a plan view of the casing transfer mechanism of the invention;

FIGURE 27 is a side elevation of the mechanism shown in FIGURE 26;

FIGURE 28 is a detailed view taken along line 28—28, FIGURE 27, of the casing engaging clamp of the transfer mechanism;

FIGURE 29 is a side elevation of a suitable powdered protein metering device for the invention;

FIGURE 30 is a detailed view of the manifold chamber for the metering device shown in FIGURE 29;

FIGURE 31 is a plan view of the rehumidification chamber for the invention;

FIGURE 32 is a side elevation of the chamber shown in FIGURE 31;

Figure 17:
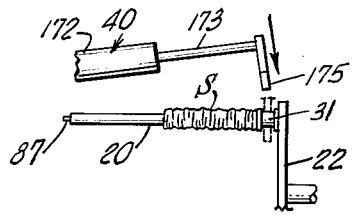
Figure 18:
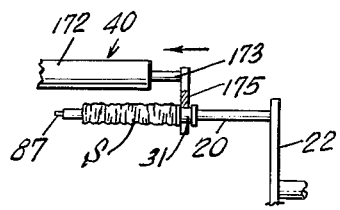
Figure 19:
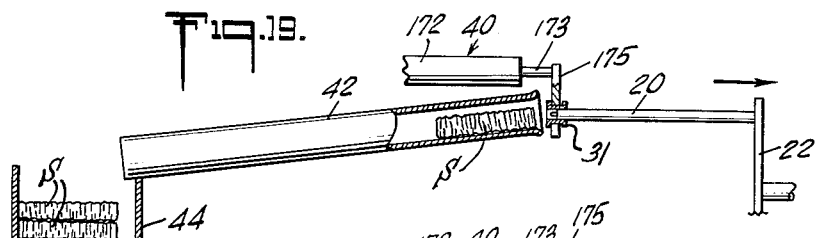

FIGURE 33–A is a detailed view of coupling means for the shirring and transport mandrels of the invention;

FIGURE 33 is a detailed side elevation of a modified form of the shirring mechanism;

FIGURE 34 is a plan view of the shirring mechanism shown in FIGURE 33;

FIGURE 35 is a sectional view, taken along line 35—35, FIGURE 33.

FIGURE 36 is a detailed view, partly in section, showing the auxiliary inflating means of the casing holder elements.

Referring now in detail to the preferred embodiment of the invention shown by way of example in the accompanying drawings, FIGURE 1 illustrates somewhat diagrammatically the structure for carrying out the invention, while FIGS. 7 to 21 illustrate schematically the successive cyclic shirring operations performed by the invention described briefly as follows:

The inflated tubular collagen body C is produced and processed as described in the said Patents Nos. 3,122,788 and 3,123,653. During the continuous passage of the collagen body C through the drying chamber D (FIGS. 31–32) the leading end upon exiting from the drying chamber D passes through re-humidification chamber 8 and is disposed about a floating or freely supported hollow shirring mandrel 10 axially positioned in body C. Upon exiting from drying chamber D and re-humidification chamber 8, the collagen body C has acquired its final dimensional properties. In a preferred embodiment, the interior diameter of such tubular body C may be 0.75 inch, internal diameter, with a wall thickness of .001 to .007 inch. Shirring mandrel 10 furnishes air, as described hereinbelow, to the collagen body C for inflating it as it passes through the drying chamber D and to the shirring apparatus, as generally described in the aforementioned application Serial No. 82,934.

To maintain air pressure in the tubular body C as it passes through the drying chamber and to assist in feeding the dried body C along shirring mandrel 10, there is provided a pair of feed rolls 12 and 14 mounted, respectively, above and below shirring mandrel 10. Rolls 12 and 14 are provided with compressible covering 15 of sponge rubber or similar resilient material which embrace the tubing C from above and below, compressing it against the exterior surface of shirring mandrel 10 (FIG. 1). The coverings 15 are sufficiently thick to meet at a line 9 which is in the horizontal plane which contains the axis of mandrel 10 thereby blocking escape of air from inflated body C to maintain it in inflated condition throughout the entire length thereof in the drying chamber D. In addition, rolls 12 and 14, while freely supporting shirring mandrel 10, draw body C through the drying chamber and feed the leading end thereof along shirring mandrel 10 to a pair of coacting shirring rolls 16 and 18 which form pleats or folds in the leading end thereof. Further, rolls 16 and 18 assist in freely supporting mandrel 10 therebetween. Rolls 12 and 14 are so constructed and disposed that a small amount of air leaks past rolls 12 and 14 and shirring rolls 16 and 18. (See FIG. 1.) This section of tubing C is inflated to facilitate the shirring operations.

Rolls 16 and 18 are preferably similar in design and operation to those disclosed in Mayer Patent 1,302,194, being provided with a plurality of helically-disposed peripheral flexible fingers or wipers 19 which frictionally engage opposed portions of the outer surface of tubing C. Fingers 19 are formed preferably of a resilient material, such as sponge rubber. In addition, fingers 19 are formed with a relatively long radius of bending (see FIG. 25) which is effective to apply a gently, progressive and prolonged wiping action to the engaged portions of the comparatively delicate thin collagen tubing C.

FIGURES 33, 34 and 35 disclose a modified form of shirring rolls 16 and 18. In this alternative embodiment, the shirring rolls 416 and 418 are mounted for rotation in like manner to rolls 16 and 18 of the preferred embodiment.

Rolls 416 and 418 are each provided with radially extending, opposed shirring fingers or elements 417, 419, respectively. Fingers 417 and 419 are each preferably twelve in number, and equally spaced around the outer periphery of their associated rolls 416 and 418 and are preferably flexible for frictionally engaging the outer surface of tubing C. Fingers 417, 419 are likewise preferably of a soft, resilient material, such as, sponge rubber, and are formed with a relatively long radius of bending for applying a gentle, progressive and prolonged wiping action to the engaged portions of the thin walled tubing C during the shirring operations, insuring thereby a gentle puckering action by the fingers.

Each shirring roll 416 and 418 is fixed on its respective operating shaft 66 and 68 so that a finger 417 of roll 416 engages the upper portion of body C simultaneously with engagement of the lower portion of body C by a finger 419 of roll 418. Thus opposed fingers 417 and 419 operate together to gently force tubing C along shirring mandrel 10; shirring or pleating the engaged tubing C. In addition, by disposing fingers 419 on rolls 418 so that they contact tubing C simultaneously with the fingers 417 on roll 416, the flexing or twisting imparted to the thin, collagen tubing during the shirring operation is maintained at a minimum, thereby reducing the tendency to damage the thin tubing wall during the shirring operation.

Means are also provided for centering tubing C horizontally on mandrel 10 as it enters the bight between the shirring rolls (FIGS. 3, 35). It has been found that tubing C has a tendency to drift in a horizontal plane on mandrel 10 and rub along a side of mandrel 10 disposed therein as the tubing is fed between the shirring rolls. During the shirring operation, a drifted tubing twists or becomes skewed on mandrel 10, resulting in possible damage to the thin collagen tubing and disruption of the continuous shirring operations. To correct this drifting condition, there is provided a pair of spaced air nozzles 420 and 422 disposed on each side of mandrel 10 in a horizontal plane through the longitudinal axis of the mandrel. Nozzles 420 and 422 are positioned to direct air streams emitting therefrom against diametrically spaced points on the outer periphery of tubing C adjacent the point of entry of tubing C between the shirring rolls (see FIG. 35). Nozzles 420 and 422 are connected to a common suitably regulated source of air under pressure (not shown) by their respective penumatic lines 424 and 426.

In operation, air under pressure of about 15 p.s.i. issues from nozzles 420 and 422 impinging horizontally against the outside of tubing C, correcting the tendency of tubing C to drift horizontally on mandrel 10 and centering tubing C prior to engagement by shirring rolls.

The shirring operation is facilitated by the provision of a yieldable barrier against which the leading end L of the shirred section S bears. The barrier tends to resist the free travel of the shirred section along shirring mandrel 10, thus permitting the fingers 19 of shirring rolls 16 and 18 to more effectively draw the engaged portions of tubing C into more pronounced pleats or folds. This barrier is especially desirable at the start of the shirring operation on the leading end of tubing C. When a substantial section of tubing has been shirred, the yieldable barrier is withdrawn since the inherent resistance of the shirred section S to free sliding movement along shirring mandrel 10 thereafter restricts free travel of the shirred section therealong.

The yieldable barrier includes a yoke-shaped, resilient finger 102 positioned against the exterior of shirring mandrel 10 in the path of travel of the shirred casing (FIGS. 1, 2 and 3). Finger 102, by its location adjacent the mandrel 10 and in advance of the casing being shirred, offers initial resistance to the free movement of the shirred section of tubing along shirring mandrel 10, thereby assisting the shirring rolls 16 and 18 to form the pleats or folds in the tubing. Finger 102 is withdrawn by an associated operating rod when a substantial amount of casing has been shirred by rolls 16 and 18.

In accordance with the invention, means are provided for removing a shirred section from the shirring mandrel and transferring it to a receiving mandrel for successive compressing operations. For this purpose, there is provided at the end of mandrel 10, remote from feed rolls 12 and 14, a plurality of horizontally-disposed, hollow, transport mandrels 20, carried by an axially movable, vertically-disposed, hollow, transport mandrels 20, carried by an axially movable, vertically-disposed, rotatable indexing turret 22. These mandrels are designed for successive co-axial connection with shirring mandrel 10, so that their internal bores 11 and 21, respectively, form a temporary continuous passage therethrough (FIG. 33–A). Air under pressure is supplied to turret 22 from air line 23 through a valve 25 in sliding engagement with the rear face of turret 22 (FIG. 1). Transport mandrels 20 are open to the rear face of turret 22 and hence, air from line 23 enters through a valve 25 and is admitted into and through bores 21 and 11 when in alignment with each other and with valve 25, and emitted from the free end of shirring mandrel 10 to inflate tubular body C (FIG. 1). For reasons hereinbefore set forth, albumin powder is entrained in the air passing through line 23 and is emitted with the air exiting from mandrel 10 against the inner surface of the body C prior to shirring.

Referring now to FIGS. 7–21 which disclose the sequential operations of the invention, when a predetermined length of tubing has been shirrred on shirring mandrel 10, a pair of opposed cutter elements 24 and 26 are actuated, as described hereinafter in detail, and travel toward mandrel 10 and into engagement with tubing C immediately before it enters the bight between the fingers 19 of shirring rolls 16 and 18 (FIG. 8). Cutter elements 24 and 26 are operative to sever the shirred section S of the tubing C from the remainder thereof.

As the cutter elements 24 and 26 are actuated, a holding or stop element 28, positioned between the feed rolls 12 and 14 and the cutter elements 24 and 26, is also actuated for positioning against mandrel 10 to momentarily impede the travel of the tubing C fed by the rolls 12 and 14 until the shirred section S of tubing C has been severed and shirring of the severed section S has been completed by rolls 16 and 18. Element 28 and cutter elements 24 and 26 are then returned to non-operative position to permit free movement of the leading end of unshirred tubing C toward shirring rolls 16 and 18 (see FIG. 9).

With the de-actuation of cutters 24 and 26 and holding element 28, turret 22 and connected shirring and transport mandrels 10 and 20 are travelled rearwardly in the direction of the arrow, FIG. 9. As the turret 22 then moves toward its rearmost position, yieldable barrier 102 is actuated to retard the advance of the leading end of the newly-shirred section S along shirring mandrel 10.

Simultaneously with the actuation of barrier 102, stripper mechanism 30 is energized and moved downwardly into engagement with an exposed section 29 of mandrel 10 between the trailing end of severed, shirred section S and the leading end of the next successive section S. In this position, stripper 30 is then moved in the direction of the arrow, FIG. 10, to transfer the completely severed and shirred section S from shirring mandrel 10 onto its temporarily associated transport mandrel 20 with the leading end of section S bearing against a loosely mounted ferrule 31 on transport mandrel 20 as turret 22 reaches its rearmost position as shown in FIG. 10. Turret 22 next returns to its original forward position (FIG. 11). This movement of turret 22 completes transfer of the shirred section S onto its associated transport mandrel 20.

At the completion of the transfer operation, the stripper mechanism 30 returns to its forward position (FIG. 12). The turret 22 and connected shirring and transport mandrels 10 and 20 are then again moved rearwardly in the direction of the arrow, FIG. 13, but as shown in FIG. 13, the opposed holders 32 and 34 engage the end of the mandrel 10 permitting the transport mandrel 20 to be disengaged from the shirring mandrel 10 upon further movement of the transport mandrel 20 in the direction of the arrow, FIG. 13.

When turret 22 reaches the limit of its rearward travel, it is indexed to present the next successive transport mandrel 20 mounted thereon into alignment with shirring mandrel 10. Turret 22 is then returned to its original position, effecting a temporary detachable connection between shirring mandrel 10 and the newly presented transport mandrel 20.

During the indexing steps, of turret 22, previously shirred sections S transferred onto associated transport mandrels 20 on turret 22 are rotated to and through a number of compression stations where a successively increasing axial compressive force is applied thereto. The compression steps produce a finished shirred section S that is compact and can be easily handled and packaged. These compression stations include a front wall 36 (FIG. 1) fixed in position on the main machine frame F on which turret 22 and the other machine elements are supported. Wall 36 has a plurality of spaced openings 37 therein corresponding to the several positions assumed by a transport mandrel 20 travelled by turret 22 from the transfer station in alignment with shirring mandrel 10 to the casing ejection station remote therefrom. Preferably there are three compression stations between the transfer and ejection stations.

When turret 22 is indexed, the transport mandrel 20 onto which the most recently shirred section S has been transferred, is rotated into alignment with uppermost opening 37. The other two transport mandrels 20 with shirred sections S thereon are likewise rotated into alignment with successive openings 37 in front wall 36. On return of turret 22 to its normal forward position, the leading end of transport mandrel 20 moves into and through its aligned opening 37. The shirred section S thereon, however, is engaged by an abutment 38 on front wall 36 and the section S is compressed between abutment 38 and ferrule 31 on its associated transport mandrel 20.

As shown in FIGS. 14–16, the abutments 38 are progressively longer at each compression station. Accordingly, the distance between the abutment 28 and ferrule 31 at each compression station in the most forward position of turret 22 is progressively shortened, resulting in the application of an increasing compressive force to the shirred section S as its length is compressd to the progressively smaller dimension at each compression station upon the forward movement of turret 22.

At the ejection station, a stripper member 40 engages the ferrule 31 on the transport mandrel 20 positioned there and effects removal of the compressed shirred section S off its associated transport mandrel 20 and into a discharge chute 42 for eventual transfer to a suitable container 44 (FIGS. 17–21).

*Feed and shirring roll support and drive mechanisms*

Referring now in detail to the structure of the preferred embodiment of the present invention, shown best in FIGS. 1–3, feed rolls 12 and 14 are mounted on the ends of shafts 46 and 48, respectively, both supported in suitable bearings in mounting plate 50 carried by the main machine frame F. To rotate shaft 46, there is provided at its free end a sprocket 52 about which is trained an endless drive chain 54. Chain 54 also passes around a sprocket 56 fixed to the output shaft 58 of a suitable power source, such as, a gear reduction motor 60.

Shaft 46 drives shaft 48, at the same speed but in opposite directions, through intermeshing pinions 62 and 64 fixed, respectively, on said shafts thereby correspondingly to rotate rolls 12 and 14 to effect travel of tubular body C along mandrel 10.

Shirring rolls 16 and 18 are, in turn, mounted on shafts 66 and 68, respectively, near the ends thereof and which are suitably journaled for rotation in plate 50. Shirring rolls 16 and 18 are driven in synchronism with rolls 12 and 14, respectively, as follows:

A second sprocket 70 is fixed to shaft 46 with an endless chain 72 trained therearound. Chain 72 also passes around a sprocket 74 fixed to shaft 66. Thus shafts 46 and 66 are rotated in the same direction. Likewise, shaft 48 is provided with a sprocket 76 around which passes an endless chain 78. Chain 78 is also trained around a sprocket 80 fixed to shaft 68, thereby effecting rotation of shafts 48 and 68 in the same direction. Sprockets 70 and 76 are similar in diameter and construction, as are sprockets 74 and 80, so that feed rolls 12 and 14 rotate at the same speed continuously as long as motor 60 is energized while shirring rolls 16 and 18 likewise rotate at the same speed continuously as long as motor 60 is energized.

Further, it has been found desirable to maintain a degree of tension on the tubing C in the portion thereof between the feed rolls 12 and 14 and the shirring rolls 16 and 18. To provide this tension, sprockets 74 and 80 are of a smaller diameter than their associated sprockets 70 and 76. Preferably, the diameters of sprockets 70 and 76 are one and one-half times greater than the diameters of sprockets 74 and 80. Thus, since chains 72 and 78 travel at the same speed from sprockets 70 and 76, every revolution of sprockets 70 and 76 effects one and one-half revolutions of sprockets 74 and 80. For every revolution of feed rolls 12 and 14, shirring rolls 16 and 18 complete one and one-half revolutions. Therefore, tubing C is being shirred faster than it is being fed and, accordingly, a controlled degree of tension or stretch is applied to the tubing section between feed rolls 12 and 14 and shirring rolls 16 and 18. It will be understood that the degree of tension applied can be readily altered to any desired amount by changing the sprocket diameter ratios of sprockets 70, 74, 76 and 80.

Mandrel construction and air supply

Shirring mandrel 10, preferably loosely supported by feed rolls 12 and 14 and shirring rolls 16 and 18, comprises an inner metallic sleeve 13 with an outer covering 17 of material having a low coefficient of friction; such as one of the tetrafluoroethylene resins. (See FIG. 33–A.) The leading end of shirring mandrel 10 is preferably tapered to facilitate insertion into tubular body C. The trailing end of shirring mandrel 10 is flared internally, as at 81, to temporarily and detachably accommodate the leading end of a transport mandrel 20 when it is presented thereto. Transport mandrel 20 likewise includes an inner metallic sleeve 23 and an outer anti-friction covering 25.

There are several transport mandrels 20 supported in cooperating sleeves 79 located in spaced apertures 77 in turret 22. The trailing ends of transport mandrels 20 pass completely through the turret 22 and terminate at the rear face of turret 22. The leading or free ends of transport mandrel 20 remote from turret 22 are each provided with a hollow insert 83 for detaching and connecting shirring and transport mandrels 10 and 20. (See FIG. 33–A.) Insert 83 includes a reduced diameter section 85 fitted into bore 21 and a reduced diameter section 87 extending outwardly from the end of transport mandrel 20. Insert 83 is also provided with an outer peripheral flange 89 which rests against the leading end of transport mandrel 20. A resilient sealing ring 91 encircles section 87 and is positioned against flange 89. Section 87 is adapted for insertion into passage 11 of shirring mandrel 10 with flare 81 facilitating entry of section 87 into shirring mandrel 10. When transport mandrel 20 has reached its limit of travel toward shirring mandrel 10, sealing ring 91 is urged into flare 81, providing an air-tight, though temporary, interconnection between shirring and transport mandrels 10 and 20 for uninterrupted air flow therethrough.

Air under pressure is delivered to shirring mandrel 10 and its associated transport mandrel 20 through valve 25 and line 23. Valve 25 bears against the rear face of turret 22 and is in sliding sealed engagement therewith. Valve 25 (FIG. 1) is fixed in position against turret 22 in alignment with shirring mandrel 10. When a transport mandrel 20 is indexed into alignment with shirring mandrel 10, air under pressure is supplied by valve 25 through opening 77 in turret 22 into that transport mandrel 20 and hence to shirring mandrel 10. However, when the turret 22 is rotated, moving opening 77 away from valve 25, the air supply to shirring mandrel 10 from line 23 is temporarily interrupted until the next successive transport mandrel 20 is rotated into alignment with shirring mandrel 10. To prevent repeated collapse of the inflated tubing C during the successive indexing operations of turret 22, an auxiliary inflating means is provided which includes an air outlet 428 in the side of one of the holder elements 34 (see FIG. 36). Air under pressure is delivered to outlet 428 through solenoid-actuated valve 430 and pneumatic line 432. Outlet 428 is directed against notched section 81 of mandrel 10, and, in general alignment with bore 11. At the start of the indexing operation, valve 430 is actuated to admit air under pressure from a regulated source of supply (not shown) into line 432 and hence from outlet 428 into mandrel 10, keeping tubing C inflated during the indexing operation of turret 22.

Thus, tubing C is continuously inflated during the operation of the machine.

Pneumatic and electrical control system

FIGS. 4, 5 and 6 disclose a suitable schematic electrical and pneumatic control system for selectively actuating the other machine elements in predetermined, timed, cyclic relationship.

The cyclic operation of the machine is effected by a variable precision speed reducing device 82; such as manufactured by the Metron Instrument Company, Denver, Colorado. Reducer 82 includes an input shaft 84 and an output shaft 86. For a given number of revolutions of shaft 84, shaft 86 makes one complete revolution. Means are provided by adjustment 88 for selectively varying the number of revolutions of shaft 84 to effect one revolution of shaft 86.

To rotate shaft 84 there is provided thereon a sprocket 90 driven by endless chain 92 from a sprocket 91 fixed to shaft 46. Output shaft 86 of reducer 82 includes a cam 96 adapted to momentarily engage and close normally-open switch 98.

The closing of switch 98 starts a cyclic operation of the machine. Reducer 82 is set such that when the desired length of tubing C has been fed by feed rolls 12 and 14 as determined by the number of revolutions of shaft 84 from shaft 46, cam 96 engages and closes switch 98. The closing of switch 98 completes an electrical circuit which energizes a synchronous timer motor 100. Timer motor 100 is constructed and arranged to remain energized after switch 98 reopens until its timing cycle has been completed. A timer motor for this purpose is produced by the Eagle Company, Torrington, Connecticut.

Timer motor 100 is provided with an output shaft on which are mounted three cams, 104, 106 and 108. Cam 104 is associated with cutters 24 and 26 and adapted to engage and close an associated open switch 110 which completes a circuit actuating cutters 24 and 26. The completed circuit energizes a solenoid valve 112, which upon actuation, admits air under pressure to air cylinders 114 and 116 mounted on plate 50. The normally-retracted piston rods 115 and 117 of cylinders 114 and 116 are connected to upper and lower cutter elements 24 and 26, respectively. Energizing solenoid 112 effects extension of rods 115 and 117 to move cutters 24 and 26 into engagement with tubing C to sewer the shirred section S from the remainder thereof. (See FIG. 8).

Cutters 24 and 26 remain in operative cutting position until the output shaft moves cam 104 out of engagement with switch 110. When switch 110 is reopened, the circuit energizing solenoid 112 is interrupted, deactuating valve 112 and effecting retraction of rods 115 and 117 into cylinders 114 and 116, thereby moving cutters 24 and 26 out of operative cutting position.

Simultaneously with the engagement of switch 110 by cam 104, cam 106 associated with holding element 28 also engages and closes an associated open switch 118 completing an electrical circuit which effects the raising and lowering of holding element 28. This completed circuit actuates solenoid valve 120 which, when actuated, admits air under pressure to an air cylinder 122 mounted on plate 50 whose normally-retracted piston rod 123 is connected to holding element 28. Upon actuation of valve 120, rod 123 is extended to move holding element 28 into engagement with tubing C to momentarily impede the travel of tubing C along mandrel 10. (See FIG. 8.) Holder 28 remains in operative holding position until cam 106 is moved out of engagement with switch 118. With switch 118 reopened, valve 120 is de-energized, effecting retraction of rod 123 into cylinder 120 and moving holder 28 out of operative holding position.

During the engagement of switch 118 by cam 106, cam 108 is rotated by the timer output shaft into momentary engagement with an associated open switch 124. The closing of switch 124 completes a circuit energizing a second timer motor 126 which remains energized after switch 124 is released by cam 108 until its timing cycle is completed. Timer motor 126 may be similar in construction and operation to timer motor 100.

The output shaft of second timer motor 126 is provided preferably with nine cams, 130, 132, 134, 136, 138, 140, 142, 144 and 146. Cams 130–146 are associated, respectively, with a normally open switch, 148–164, and are operative to sequentially engage and close their associated switches to complete separate electrical circuits.

Figure 22:
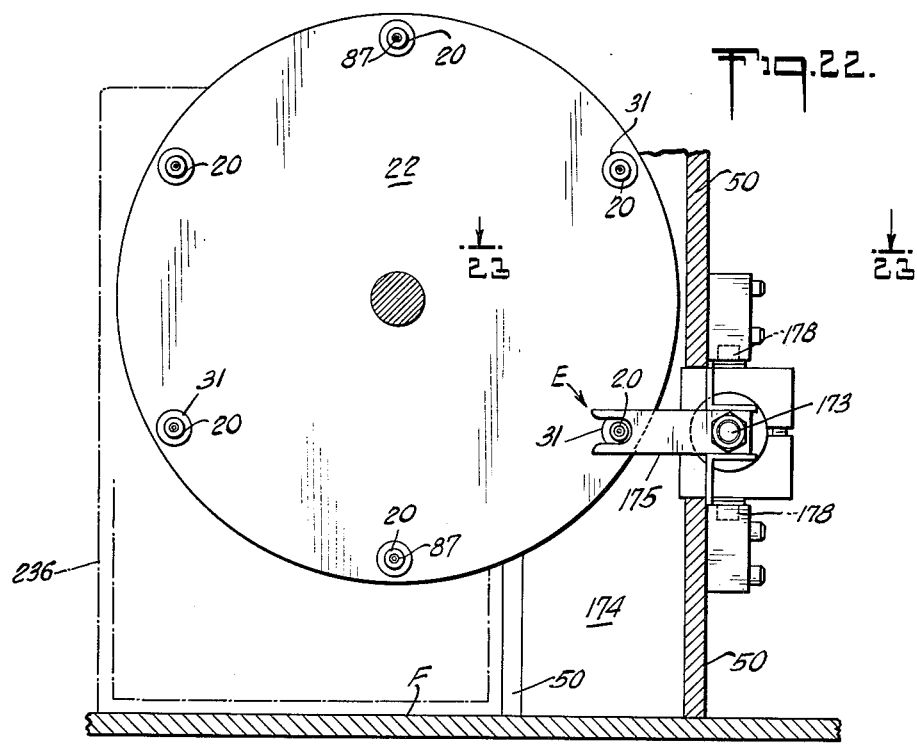
FIGURE 22 is a rear view of the invention illustrating the ejector mechanism.
Figure 23:
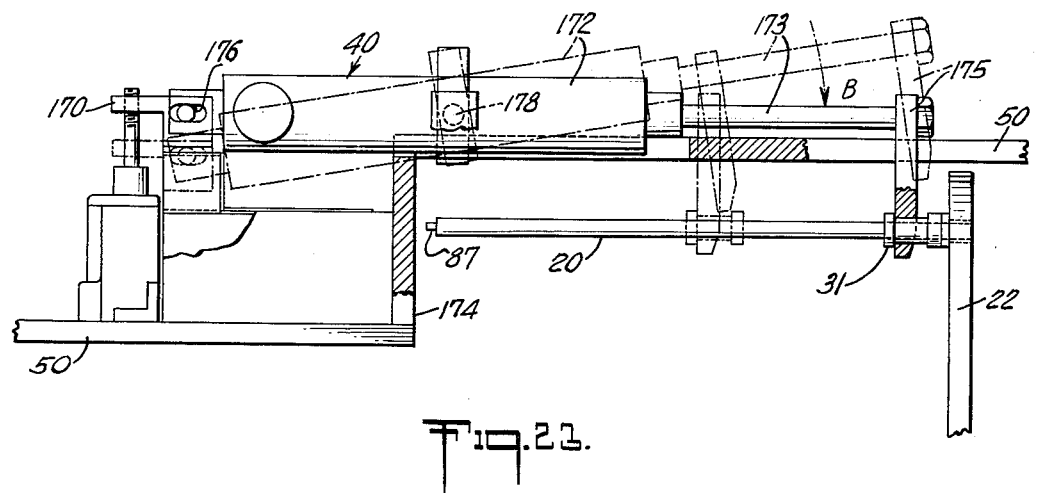
FIGURE 23 is a plan view of the mechanism shown in FIGURE 22, taken along line 23—23, FIGURE 22.

The circuit completed by cam 130 and associated switch 148 energizes a solenoid valve 166 which travels ejector 40 into and out of operative position. Valve 166 admits air under pressure to an air cylinder 168 mounted on plate 50 of main machine frame F adjacent the ejection station E. (See FIGS. 22 and 23.) The normally-retracted piston rod 169 of cylinder 168 is pinned to one end of link connector 170 while the other end of link 170 is pinned to the end of ejector 40 which includes an ejector air cylinder 172 pivotally mounted at 178 to vertical plate 174 fixed to frame F. Ejector cylinder 172 has a normally extended piston rod 173 and the connection of link 170 to cylinder 172 includes an elongated slot 176.

Upon actuation of cylinder 168, rod 169 thereof is extended pivoting ejector air cylinder 172 about its pivotal connection 178 and rotating the free end of extended rod 173 toward a transport mandrel 20 indexed into position at ejection station E. (See FIG. 23.) Rod 173 is provided with a transverse gripper element 175 provided with a terminal notch 177. Movement of cylinder 172 toward mandrel 20 effects entry of transport mandrel 20 at ejection station E into notch 177 of gripper 175. Since rod 173 is normally extended, gripper 175 engages ferrule 31 on transport mandrel 20 at station E. When solenoid valve 166 is de-energized, rod 169 is retracted, effecting movement of ejector cylinder 172 away from the path of travel of transport mandrels 20 and disengaging ferrule 31 from gripper 175.

The circuit completed by cam 132 and its associated switch 150 moves turret 22 longitudinally back and forth by energizing a solenoid valve 180 which admits air under pressure to double-acting air cylinder 182 fixed to the main machine frame F. The piston rod 183 of cylinder 182 is connected to an extension of turret support plate 186 slidably supported on guides 188. Guides 188, in turn, are supported by spaced guide blocks 190 and front wall 36 fixed to frame F. (See FIGS. 2 and 3.) In addition, blocks 190 cooperate with transverse flanges 187 on plate 186 to operate as forward and rearward limits of travel for turret 22. Normally, solenoid valve 180 admits air to cylinder 182 to extend rod 183 thereof. However, completion of the circuit energizing valve 180 effects admission of air to the side of cylinder 182 for effecting retraction of rod 183, thereby moving plate 186 and turret 22 in the direction of arrow A, FIG. 1. Upon de-energizing of solenoid valve 180, air is again admitted into cylinder 182 to extend rod 183, and returns turret 22 to its forward position, shown best in FIG. 2. This return completes the first longitudinal reciprocation of turret 22 during the machine cycle.

The circuit completed by cam 134 and switch 152 effects ejection of a shirred and compressed section S from its associated transport mandrel 20 at ejection station E. The completed circuit energizes an internal solenoid valve 171 in ejector air cylinder 172 to admit air under pressure thereto. This retracts rod 173 thereof, moving gripper 175 along transport mandrel 20 positioned at the ejection station E. (See FIGS. 22 and 23.) A ferrule 31 on a transport mandrel 20 at station E is engaged by gripper 175 and travelled forwardly therealong. This movement of gripper 175 and ferrule 31 removes shirred section S at station E from its associated transport mandrel 20 and deposits it in delivery chute 42 positioned in alignment with the free end of transport mandrel 20 at station E. (See FIG. 19.) Upon disengagement of switch 152 by cam 134, air cylinder 172 is de-energized, returning rod 173 to its normally extended position to await the next transport mandrel 20 and shirred section S delivered to ejection station E.

The circuit completed by cam 136 and its switch 154 activates retard finger 102 by energizing solenoid valve 194 which admits air under pressure to air cylinder 196 extending rod 197 thereof. Cylinder 196 is mounted on a bracket 198 fixed to plate 50. (See FIGS. 20 and 21.) The free end of rod 197 is secured by resilient finger 102 and when rod 197 is extended, finger 102 is moved upwardly into position adjacent shirring mandrel 10. Finger 102 includes a terminal notch 199 for partially surrounding shirring mandrel 10. In this position, finger 102 offers a yieldable barrier against which the leading end of the shirred section S bears to facilitate the shirring operation of rolls 16 and 18.

Figure 20:
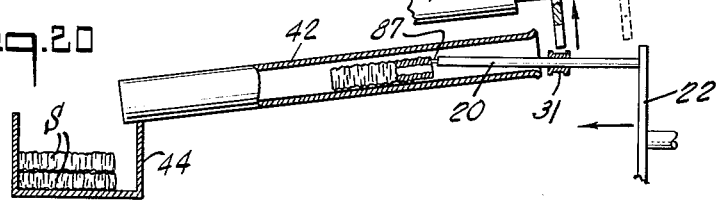
Figure 21:
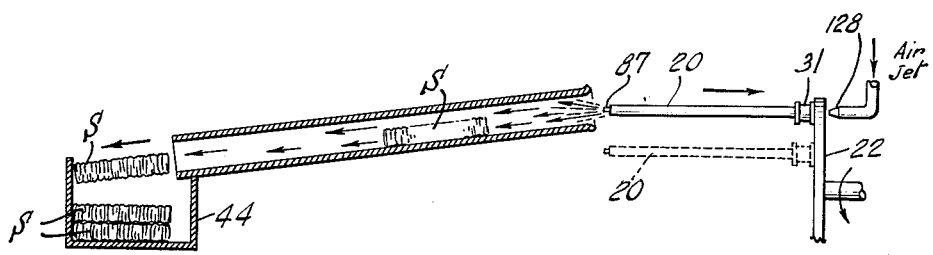

As the shirred section is advanced along shirring mandrel 10, finger 102 is travelled therewith along a guide rod 200 on which it is slidably mounted, as shown in phantom in FIG. 20. Rod 200, in turn, is supported at one end in a block 202 fixed to bracket 198 and at its other end in wall 36. (See FIG. 2.) When solenoid 194 is de-actuated and rod 197 retracted into cylinder 196, finger 102 is moved out of engagement with the leading end of the shirred section and returned to its original position shown in full lines in FIG. 20.

To return finger 102 to its original position, one end of a take-up line 201 is fixed thereto. Line 201 passes over roller 203 on block 202 and is wound, at its other end, about a freely rotatable reel 204 supported by bracket 198. The return mechanism also includes a take-up spiral spring element 205, one end of which is anchored to stud 206 in bracket 198. The other end of spring 205 is wound about reel 204, normally urging reel 204 to rotate in the direction of line take-up.

When finger 105 is in engagement with section S, the movement thereof overcomes the action of spring 205 and line 201 is unwound from reel 204. When finger 102 is moved out of engagement with section S by retraction of rod 197, spring 205 effects rewind of line 201 by reel 204 returning finger 102 to its original position until the next actuation of cylinder 196.

The circuit completed by cam 138 and its associated switch 156 effects raising and lowering of stripper 30. This circuit actuates an internal solenoid valve 208 of air cylinder 210 admitting air into cylinder 210. Valve 208 and cylinder 210 are pivotally connected at one end to bracket 209 fixed to the rear face of plate 50. (See FIGS. 26–28.) The piston rod 211 of cylinder 210 is normally-extended and pinned at its free end to crank arm 212. Crank arm 212, in turn, is fixed transversely to one end of shaft 214 which extends through plate 50 and is carried in sleeve 216 fixed to plate 50. The other end of shaft 214 is provided a transverse extension 218 disposed on shaft 214 at approximately right angles to crank arm 212. The free end of extension 218 has a roller cam element 220 which supports the front end of stripper mechanism 30.

Stripper mechanism 30 also includes an air cylinder 222 and a solenoid control valve 224. Roller 220 is freely retained in position under the front end of cylinder 222 by a collar 221 fixed to cylinder 222. The end of cylinder 222, remote from roller 220, is provided with a bracket 226 pivotally connected by pin 228 between pivot supports 230 fixed to bracket 232 secured to the front face of plate 50. Normally retracted piston rod 233 of cylinder 222 includes, at its free end, a lateral extension 234 which depends therefrom and in operative position, shown in FIG. 23, bears against the outer periphery of shirring mandrel 10 and associated transport mandrel 20.

To grip and encircle attached shirring and transport mandrels 10 and 20 during its travel therealong, extension 234 is provided with a terminal notch 236 conforming generally to the shape of the mandrels. To close notch 236 when extension 234 is adjacent the mandrels and thereby completely encircle the engaged mandrels, extension 234 is provided with a latch arm 238 which is pivotally connected to one side of extension 234. Arm 238 is of an arcuate configuration and is pivotally connected to extension 234 adjacent its midpoint. Latch arm 238 is adapted to close notch 236 and thereby complete the encirclement of the mandrels.

Normally, with stripper mechanism 30 in raised nonoperative position (shown best in FIG. 1), latch 238 freely depends from one side of extension 234 permitting free access to notch 236. However, the section 239 of arm 238 extends into notch 236 adjacent the inner periphery thereof. (See FIG. 1.) When section 234 is moved into operative position adjacent shirring mandrel 10, which becomes positioned in notch 236, shirring mandrel 10 engages section 239 of arm 238 and the downward relative movement therebetween pivots arm 238 about its connection to extension 234 moving the terminal portion of arm 238 around the bottom of shirring mandrel 10, thereby closing notch 236 and completing encirclement of the mandrel.

When solenoid valve 208 is energized actuating cylinder 210, rod 211 thereof is retracted. Retraction of rod 211 rotates crank arm 212 in the direction of arrow B, FIG. 23, away from the position shown in phantom in FIG. 23. Cylinder 210 and valve 208 pivot about their connection to bracket 209 to accommodate the rotation of crank arm 212 by rod 213. The rotation of crank arm 212 also effects rotation of shaft 214 and movement of extension 218 and roller 220 in the direction of arrow B. Since 220 bears against the underside of cylinder 222 of stripper 30, this movement of roller 220 pivots stripper mechanism 30 about its connection to bracket 232 raising stripper 30 from its operative position shown in FIG. 23 to a position above and out of engagement with shirring and transport mandrels 10 and 20. The upward relative movement between the mandrels and latch 238 pivots arm 238 out of locking position, reopening notch 236. Upon interruption of the circuit energizing valve 208, rod 211 is re-extended returning stripper mechanism 30 to its operative stripping position with extension 234 and arm 238 encircling mandrels 10 and 20.

The circuit associated with cam 140 and switch 158 accomplishing the transfer operation by effecting forward and rearward movement of rod 223 of stripper mechanism 30. Completion of this circuit energizes solenoid valve 224 which admits air under pressure to air cylinder 222. Piston 223 thereof is in normally extended position and upon admission of air into cylinder 222, rod 223 is retracted, moving extension 234 of stripper 30 along shirring mandrel 10 and its temporarily associated transport mandrel 20, transferring a shirred section S from shirring mandrel 10 onto transport mandrel 20. Interruption of the circuit energizing solenoid valve 224 effects extension of rod 223 until the next transfer operation.

The circuit associated with cam 142 and switch 160 effects pre-indexing forward and rearward longitudinal movement of turret 22 in the same manner as the circuit associated with cam 132 and switch 150. Completion of the circuit energizes solenoid valve 180 to retract piston rod 183, travelling turret 22 rearwardly in the direction of the arrow, FIG. 13. Interruption of the circuit effects extension of rod 183 and return of turret 22 to its forwardmost position shown in FIG. 3, completing the second longitudinal reciprocation of turret 22 during a single machine cycle.

Engagement of switch 162 by its associated cam 144 completes a circuit effecting movement of opposed holders 32 and 34 into and out of gripping engagement with shirring mandrel 10. In addition, completion of this circuit actuates solenoid-operated valve 430, admitting air under pressure to line 432 and hence to outlet 428 and mandrel 10. Completion of this circuit energizes a solenoid valve 240 which admits air under pressure to air cylinders 242 and 244, fixed to brackets 246 and 248, respectively, secured to the top of front wall 36. (See FIGS. 2 and 3.) Cylinders 242 and 244 are disposed on each side of shirring mandrel 10 with their respective piston rods 241 and 243 fixed to holder elements 32 and 34, respectively. Rods 241 and 243 are normally retracted. Upon actuation of solenoid valve 240, rods 241 and 243 are extended, moving their associated holders 32 and 34 into gripping engagement with shirring mandrel 10. Holders 32 and 34 remain in gripping engagement with shirring mandrel 10 until the circuit associated with cam 144 is interrupted. Breaking of this circuit de-energizes solenoid valve 240 effecting retraction of rods 241 and 243 into their respective cylinders 242 and 244. This releases shirring mandrel 10 from engagement by grippers 32 and 34. In like manner, breaking of this circuit de-energizes solenoid valve 430, interrupting the admission of air to line 432 and outlet 428 upon release of mandrel 10 by grippers or holders 32 and 34.

The circuit associated with the cam 146 and switch 164 effects the indexing of turret 22. Completion of this circuit energizes a solenoid valve 247 which admits air under pressure to one side of double-acting air cylinder 249 preferably formed integrally with turret 22 to extend the cylinder piston rod (not shown). An internal rack (not shown) attached to the free end of the cylinder piston rod (not shown), drives a gear which carries a pawl to actuate the index plate upon extension of the piston rod, thereby rotating turret 22 a predetermined amount. Interruption of the circuit energizing valve 247, interrupts entry of air to the one side of cylinder 249 and admits air under pressure to the other side of air cylinder 249, effecting a positive retraction of the piston rod (not shown) and maintaining the piston rod in retracted position until the indexing of turret 22 during the next successive machine cycle.

To assist the movement of the shirred sections S through chute 42 into package 44, there is provided an exhaust line 128 for control valve 247 of cylinder 249. Line 128 vents air from cylinder 249 during the indexing stroke of its piston rod (not shown). Air vented from cylinder 249 is conducted to ejection station E by line 128 and into alignment with the transport mandrel 20 positioned thereat. (See FIG. 21.) The air vented during the indexing of turret 22 is emitted through mandrel 20 located at station E at the start of the rotation of turret 22 and against a shirred section S in chute 42. This momentary air blast completes the movement of shirred section S into package 44 and insures that all ejected sections S are travelled through chute 42 into package 44.

A suitable indexing turret and integral actuating cylinder is the Allen Air Dial Feed Table, Model 11E, manufactured by the A. K. Allen Company, Mineola, N.Y.

*Albumin applicator*

Turning specifically to FIGS. 29 and 30, there is illustrated mechanism for metering and feeding proteinaceous materials in the form of dry albumin powder into the airstream in line 23 for coating the inside of inflated collagen tube C. This mechanism includes a metering and feeding device 300 which is preferably vibratory to insure smooth and even flow of the powdered albumin. Powdered albumin is placed in hopper 302 and is fed by a combination of gravity and hopper vibration into housing 301 and hence into the range of operation of screw feed or auger 304 rotatably mounted inside housing 301. Shaft 305 for rotating screw feed or auger 304 extends outwardly from housing 301 and is provided with belt and pully drive 299. Belt and pulley drive 299 is, in turn, driven from gear reducer 306 and motor 310 to rotate shaft 305 and auger 304. Auger 304 extends into a delivery tube 303 and rotation of auger 304 moves the powdered albumin fed thereto from hopper 302 along tube 303 in the direction of the arrow, FIG. 29, to discharge end 312 thereof.

At discharge end 312 there is provided a manifold chamber 314 wherein the powdered albumin is entrained in the airstream entering line 23. Manifold chamber 314 includes a mixing chamber 313 which is preferably of an inverted tear-drop shaped cross-section. The discharge end 312 of the tube 303 is connected through the rear face 311 of chamber 314 to the upper arcuate section 309 of mixing chamber 313. Manifold chamber 314 includes an inlet opening 316 communicating with one side of mixing chamber 313 at the tapered lower section 307 thereof. The other side of section 307 communicates with outlet opening 318 to which line 23 is connected.

The albumin powder in hopper 302 is fed by screw feed or auger 304 into the upper section 309 of mixing chamber 313. The continued feed of albumin powder by auger 304 urges the albumin powder entering section 309 toward lower section 307. With manifold 314 mounted in a generally vertical position, the force of gravity also assists in moving the powder from upper section 309 to lower section 307. The air supply line 319 is connected to a suitable regulated source of supply for air under pressure; such as a compressor and regulator valve (not shown). Air from line 319 entering section 307 of mixing chamber 313 entrains the albumin powder fed thereto and carries it along through outlet opening 318 into line 23 for delivery to mandrel 20 and its associated mandrel 10.

The volumetric rate at which the albumin is discharged into manifold chamber 314 is determined by the size and design of the auger flutes and the speed of rotation of the auger. With a given size auger, the speed of rotation can be varied by changing the input and output ratios of speed reducer 306 to vary the amount of albumin fed along tube 303. Further, the vibration of hopper 302 insures that the housing 301 will at all times be completely filled with powder thereby insuring a constant albumin feed by auger 304.

A suitable vibratory metering and feeding device 300 is disclosed in Wall Patent 2,800,252 and further discussion thereof is omitted in the interest of brevity.

To equalize the pressure in hopper 302, housing 301 and mixing chamber 313, and thereby prevent back-feed of albumin powder by the air from line 319 during the indexing of turret 22, manifold chamber 314 is provided with a pressure relief opening 320 which communicates with the top of the mixing chamber 313. Pressure relief opening 320 is connected by pressure lines 322 and 324 to hopper 302 and housing 301, respectively. The presurized air in lines 322 and 324 is static, maintaining a constant presure head on hopper 302 and housing 301. During the inflation operation, the pressurized air from line 319 is released to the atmosphere through line 23 and associated shirring and transport mandrels 10 and 20. When turret 22 is indexing, however, and release of air from line 23 is temporarily interrupted, the air in lines 322 and 324 provide back pressure, preventing air from line 319 from attempting to escape through tube 303 and thereby disrupting albumin feed by auger 304. Thus, relief pressure lines 322 and 324 insure smooth, continuous feed of metered amounts of albumin powder into chamber 314 despite the periodically interrupted flow of air from line 319 to line 23, always providing thereby for the application of the proper amount of albumin to the inside wall surface of collagen tube C. Subsequent shirring of each treated tube C into compact casing units, combines to prepare it for subseqeunt successful stuffing, linking and cooking operations.

Rehumidification chamber

To insure that the thin tubular body C is pliable after it leaves the drying chamber D, as shown in FIGS. 31 and 32, the thin-walled body C enters a rehumidification chamber 8 located between drying chamber D and the front feed rolls 12 and 14. Chamber 8 is operative to remoisten tube C prior to shirring. The remoistening or rehumidifying step conditions the tube C, whose wall thickness is in the range of .001 or less, by making it more pliable and less susceptible to cracking than an overly dry thin collagen tube. An overly dry thin collagen tubular body exhibits some parchment-like qualities and under the stress and strain induced by the shirring operation, such dry brittle thin-walled tubular bodies crack and tear, becoming useless for subsequent stuffing and linking into sausage products. Rehumidification chamber 8 remoistens the thin tubular body C prior to shirring, making it pliable and able to withstand the shirring operations without adverse effects.

It has also been found that a rehumidified section, after shirring and compressing, exhibits less tendency to rebound or return to its original shape or length. The rehumidified section remains as a compact, compressed unit, facilitating subsequent packaging and handling.

Rehumidification chamber 8 includes an insulated housing 332 with a hinged access top or cover 334 having a transparent viewing panel 330 and entrance and exit ports 336 and 338 in the side panels 335 and 337, respectively, of housing 332. Thin-walled tubular body C, in a dry, inflated condition, enters chamber 8 through port 336 and, still in inflated condition, passes through, exiting by port 338. Body C is moved through chamber 8 in the same manner that it was travelled through drying chamber D as described in the aforementioned Patent No. 3,123,653.

To rehumidify the thin and dry tubular body C passing through chamber 8, there is provided a conduit 340 in chamber 8 connected to a suitable source of rehumidifying media, such as live steam or water vapor. The steam exits from conduit 340 from ports 342 therein, impinging against the outside of body C, moistening and thereby rehumidifying it as it passes through chamber 8. Thermometer 344 positioned adjacent the path of travel of body C in chamber 8, is provided for registering the temperature in chamber 8 adjacent body C and furnishing thereby visual control for the operator who can increase or decrease the steam pressure in conduit 340 to maintain the temperature and, thus, the rehumidification operation at the desired level to provide a pliable collagen tube C in suitable condition for shirring.

Operational sequence

Turning now to FIG. 4, there is graphically illustrated the synchronous, operating relationship of the various elements of the invention. FIG. 4 is illustrative of a thirty second machine cycle with the feed rolls 12 and 14 normally operating to feed fifty feet of body C per minute. With the machine cycle set at thirty seconds, it will be understood that sections twenty-five feet long are shirred and cut from the leading end of collagen tube C. The speed reducer 82 is, therefore, set so that output shaft 86 thereof makes one complete revolution for the number of revolutions of shaft 84 corresponding to twenty-five feet of tubing C fed by rollers 12 and 14.

Motor 60 is actuated by the operator to continuously rotate rolls 12, 14, 16 and 18 described hereinabove, to travel tube C through drying chamber D and rehumidification chamber 8. Simultaneously, motor 310 and the air supply compressor (not shown) are actuated to inflate and coat the inside of tube C with powered albumin as it travels toward feed rolls 12 and 14.

When twenty-five feet of tubular body C have been fed by feed rolls 12 and 14, cam 96 of reducer 82 momentarily engages and closes normally open switch 98 starting the machine cycle. In a thirty second cycle, cam 96 is in engagement with switch 98 for approximately one second.

Preferably, timer motor 100 has a fifteen second cycle. Timer motor 100 actuated by the circuit completed by cam 96, starts its output shaft rotating with its associated cams 104, 106 and 108. Cam 104 is adapted to engage its associated switch 110 six seconds after the start of the machine cycle, and remains in engagement with switch 110 for one second, to effect the severing of a shirred section S from the leading end of body C.

Simultaneously with the engagement of switch 110 by cam 104, cam 106 engages its associated switch 118 and remains in engagement with switch 118 for approximately five seconds. Thus, while cutters 24 and 26 and holder element 28 are actuated simultaneously, holding element 28 remains actuated for four full seconds after cutters 24 and 26 have returned to non-operative position.

Nine seconds after the start of the machine cycle, cam 108 engages its associated switch 124, thereby energizing timer motor 126.

Fifteen seconds after the start of the machine cycle, timer motor 100 completes its cycle operation and automatically is de-energized until the next engagement of switch 98 by cam 96.

Engagement of switch 124 by cam 108 energizes its associated cams 130–146. One second after the start of the second timer motor or ten seconds after the start of the machine cycle, cam 130 engages its associated switch 148 moving gripper element 175 of ejector 40 into engagement with ferrule 31 on the transport mandrel 20 positioned at ejection station E. Cam 130 remains in engagement with switch 148 for nine seconds maintaining gripper element 175 in engagement with ferrule 31 on transport mandrel 20 at ejection station E. At the end of nine seconds, cam 108 is rotated out of engagement with switch 148 moving ejector 40 out of the path of travel of transport mandrels 20 until the next machine cycle.

Two seconds after the actuation of timer motor 26 or eleven seconds after the start of the machine cycle, cam 132 engages its associated switch effecting rearward longitudinal movement of turret 22 and shirring mandrel 10 and its associated transport mandrel 20. Turret 22 is maintained in its rearward position for twelve and one-half seconds, at the end of which time, cam 132 is rotated out of engagement with switch 150 and turrent 22 and associated shirring and transport mandrels 10 and 20 are returned to their forwardmost position.

While turret 22 is in its rearward position and five seconds after the actuation of timer motor 126, cam 134 engages switch 152 moving gripper 175 of ejector 40 along transport mandrel 20 to effect ejection of the shirred section S thereon. Cam 134 remains in engagement with switch 152 for six seconds to insure completion of the casing ejector at which time cam 134 disengages switch 152 effecting return of gripper 175.

Before the ejection operation described above has started, cam 136 engages its switch 154. Cam 136 engages its switch 154 four seconds after the start of timer motor 126 or thirteen seconds after the start of the machine cycle to raise resilient barrier 102 into position against the leading end L of the next succeeding section being shirred. Cam 136 remains in engagement with its switch 154 for six seconds after which the circuit associated with barrier 102 is interrupted and barrier 102 returned to its non-operative position to await the next machine cycle.

While turret 22 is in its rearward position and six and one-half seconds after the start of timer motor 126, cam 138 engages its associated switch 156 lowering stripper 30 into engagement with shirring mandrel 10 for nine and one-half seconds after which cam 138 moves out of contact with its associated switch 156.

One second after the positioning of stripper 30 in engagement with shirring mandrel 10, cam 140 engages its associated switch 158, retracting rod 223 of stripper mechanism 30 and effecting transfer of the shirred section S from shirring mandrel 10 to transport mandrel 20 associated therewith. Cam 140 remains in contact with switch 158 for ten seconds to permit completion of the transfer operation.

During the transfer operation, turret 22 is returned to its forwardmost position, thereby assisting in the transfer operation. At the start of the next successive machine cycle, or twenty-one seconds after the energizing of timer motor 126, cam 142 engages switch 160 thereby moving turret 22 longitudinally to its rearmost position for the second time during the machine cycle.

While turret 22 is moving towards its rearmost position, cam 144 engages switch 164 actuating shirring mandrel holders 32 and 34. Upon actuation, holders 32 and 34 grip shirring mandrel 10 as it starts to move rearwardly with turret 22. Holders 32 and 34 immobilize shirring mandrel 10, effecting disengagement by the shirring mandrel 10 and its associated transport mandrel 20. Simultaneously with the actuation of holders 32 and 34, air under pressure is supplied to outlet 428 to maintain inflation of tubing C upon disengagement of mandrel 10 and its associated transport mandrel 20.

When turret 22 has reached its rearmost position, cam 146 engages switch 164 to effect indexing of turret 22. Turret 22 remains in its rearmost position for seven seconds after which time, cam 142 is moved out of engagement with switch 160, effecting return of turret 22 to its forwardmost position.

Holders 32 and 34 are de-actuated simulatenously with the start of movement of turret 22 to its forwardmost position. Cam 146 disengages switch 164 simultaneously with the start of movement of turret 22 to its forwardmost position. This effects release of shirring mandrel 10 by holders 32 and 34 and interrupts the supply of air to outlet 428.

As will be noted, these last three operations; i.e., rearward movement of turret 22, shirring mandrel hold and turret indexing, occur during the initial portion of the next successive machine cycle as determined by speed reducer 82.

The machine maintains the cyclic operation described above travelling a shirred section S on its associated transport mandrel 20 through a plurality of compression stations to ejection station E, while continuously shirring the leading end of tubular body C, and severing it into shirred sections twenty-five feet in length.

It will be understood that the timing cycle described above is by way of example and that other timed relations of the machine mechanism, if desired, can readily be obtained by adapting the cams to increase or decrease, as desired, the time that the cams are in engagement with the associated switches. In addition, the inter-relation of the machine mechanisms can be readily varied by varying the orientation of the cams on the output shafts of their respective timer motors.

Thus, there is disclosed a simple, efficient mechanism for continuously and automatically producing from a continuous inflated tube, preferably of dried collagen, shirred, compressed and internally coated lengths of pleated sections ready for subsequent stuffing, linking and cooking as sausage products.

While the invention has been described in detail according to the preferred manner of carrying out the method and the devices embodying the invention, it will be obvious to those skilled in the art, after understanding the invention, that changes and modifications may be made therein without departing from the spirit or scope of the

What I claim is:

1. Mechanism for shirring a continuous tube of material suitable for use as a sausage casing including, in combination: a shirring mandrel disposed axially within said tube, a pair of co-acting shirring rolls for shirring said tube on said mandrel, means rotatably mounting said rolls at diametrically opposed portions of the outer surface of said tube on said mandrel, a plurality of spaced flexible wiping fingers for each of said rolls, said flexible wiping fingers formed of soft rubber and having a relatively long radius of bending, said flexible fingers also extending radially and axially along the periphery of said rolls, said fingers being operative to frictionally engage opposed sections of said tube on said shirring mandrel to wipe the tube along said mandrel, means for rotating said rolls and associated fingers to shirr said engaged sections of said tube on said mandrel, means for continuously supplying said tube to said shirring rolls, means for severing shirred sections of said tube into predetermined lengths, and means for periodically removing said shirred and severed sections from said shirring mandrel.

2. Mechanism for shirring a continuous dried collagen tube including, in combination: a shirring mandrel disposed axially within said tube, means for admitting air under pressure to said mandrel for inflating said tube, a pair of co-acting shirring rolls for shirring said tube on said mandrel, means mounting said rolls at diametrically opposed portions of said tube on said mandrel, a plurality of spaced, resilient fingers on each of said rolls, means mounting said fingers in spaced relationship on the periphery of said rolls, said fingers being formed of soft rubber and having a relatively long radius of bending for applying to said tube a gentle, progressive and prolonged wiping action therebetween, means for rotating said rolls and associated fingers to shirr said engaged sections of said tube on said mandrel, means for continuously supplying said tube to said shirring rolls, means for centering said tube on said mandrel before entry of said tube between said shirring rolls, means for severing shirred sections of said tube into predetermined lengths, and means for periodically removing said shirred and severed sections from said shirring mandrel.

3. Mechanism for shirring lengths of a sausage casing tubing formed of extruded collagen including, in combination: a mandrel around which said tubing is disposed to travel axially therealong, said mandrel extending into a drying chamber through which the tubing travels continuously for drying after extrusion and post-extrusion processing, means for maintaining the tubing in tubular form within the drying chamber and externally thereof as it passes along the mandrel, means for shirring a length of said tubing as its passes along the mandrel, said means including a pair of co-acting shirring rolls having a plurality of fingers formed of soft, yieldable, resilient material and having a relatively long radius of bending for applying to said tubing a gentle, progressive and prolonged wiping action, means for severing said shirred length, means for compressing said shirred length, and means for delivering said compressed, shirred length.

4. The mechanism of claim 3 wherein feeding means are provided for feeding the tubing continuously through the drying chamber and along the mandrel to said shirring means.

5. The mechanism of claim 3 wherein means are provided for inflating the tubing to maintain its tubular form throughout its travel in the drying chamber and along the mandrel.

6. The mechanism of claim 3 wherein means are provided for humidifying the tubing between the drying chamber and the shirring means.

References Cited by the Examiner

UNITED STATES PATENTS

| 1,302,194 | 4/19 | Mayer. | |
| 2,583,654 | 1/52 | Korsgaard | 17—42 |
| 2,819,488 | 1/58 | Gimbel | 17—42 |
| 2,901,358 | 8/59 | Underwood et al. | 99—176 |
| 2,983,949 | 5/61 | Matecki | 17—42 |
| 2,988,451 | 6/61 | Zahn | 99—176 |

SAMUEL KOREN, *Primary Examiner.*

LUCIE H. LAUDENSLAGER, *Examiner.*

UNITED STATES PATENT OFFICE
CERTIFICATE OF CORRECTION

Patent No. 3,209,398                                    October 5, 1965

Francis Joseph Ziolko

It is hereby certified that error appears in the above numbered patent requiring correction and that the said Letters Patent should read as corrected below.

Column 6, lines 24 and 25, for "penumatic" read -- pneumatic --; column 10, line 54, for "sewer" read -- sever --; column 17, line 61, for "ejector" read -- ejection --.

Signed and sealed this 12th day of July 1966.

(SEAL)
Attest:

ERNEST W. SWIDER
Attesting Officer

EDWARD J. BRENNER
Commissioner of Patents